INVENTOR.
MELVILLE CLARK, JR.
BY
Lippincott, Ralls & Hendricson
ATTORNEYS

INVENTOR.
MELVILLE CLARK, JR.

BY

Lippincott, Ralls & Hendricson
ATTORNEYS

April 29, 1969 M. CLARK, JR 3,441,653

SIGNAL WAVEFORM GENERATION

Filed Sept. 30, 1963 Sheet 3 of 13

INVENTOR.
MELVILLE CLARK, JR.

BY

Lippincott, Ralls & Hendricson
ATTORNEYS

April 29, 1969 M. CLARK, JR 3,441,653

SIGNAL WAVEFORM GENERATION

Filed Sept. 30, 1963 Sheet 4 of 13

INVENTOR.
MELVILLE CLARK, JR.

BY

Lippincott, Ralls & Hendricson
ATTORNEYS

INVENTOR.
MELVILLE CLARK, JR.
BY
Lippincott, Ralls & Hendricson
ATTORNEYS

INVENTOR.
MELVILLE CLARK JR.
BY
Ezekiel Wolf, Wolf & Greenfield
ATTORNEYS

April 29, 1969 M. CLARK, JR 3,441,653

SIGNAL WAVEFORM GENERATION

Filed Sept. 30, 1963 Sheet 7 of 13

INVENTOR.
MELVILLE CLARK JR.
BY
Ezekiel Wolf, Wolf & Greenfield
ATTORNEYS

INVENTOR.
MELVILLE CLARK JR.
BY
Ezekiel Wolf, Wolf & Greenfield
ATTORNEYS

INVENTOR.
MELVILLE CLARK JR.
BY *Ezekiel Wolf, Wolf & Greenfield*
ATTORNEYS

April 29, 1969 M. CLARK, JR 3,441,653

SIGNAL WAVEFORM GENERATION

Filed Sept. 30, 1963 Sheet 10 of 13

INVENTOR.
MELVILLE CLARK JR.
BY
Ezekiel Wolf, Wolf & Greenfield
ATTORNEYS

KEY CONTROLLED PERTURBING BIAS FREQUENCY CONTROL OF UNIVIBRATOR COUNTER CHAIN

INVENTOR.
MELVILLE CLARK JR.
BY
Ezekiel Wolf, Wolf & Greenfield
ATTORNEYS

KEY CONTROLLED PERTURBING RESISTOR FREQUENCY CONTROL OF OSCILLATOR

KEY CONTROLLED PERTURBING CONDENSER FREQUENCY CONTROL OF OSCILLATOR

INVENTOR.
MELVILLE CLARK JR.
BY
Ezekiel Wolf, Wolf & Greenfield
ATTORNEYS

INVENTOR.
MELVILLE CLARK JR
BY
Ezekiel Wolf, Wolf + Greenfield
ATTORNEYS 3,441,653
SIGNAL WAVEFORM GENERATION
Melville Clark, Jr., 8 Richard Road,
Cochituate, Mass. 01778
Continuation-in-part of application Ser. No. 15,421, Mar. 16, 1960. This application Sept. 30, 1963, Ser. No. 313,415
Int. Cl. G10h 3/06, 1/02, 3/00
U.S. Cl. 84—1.17 48 Claims This application is a continuation-in-part of copending application Ser. No. 15,421 filed Mar. 16, 1960, now abandoned.

The present invention relates in general to signal waveform generation and more particularly concerns novel methods and means for generating complex quasi-periodic signal waveforms of the type produced by the different musical instruments in an orchestra. The invention facilitates precise control over the signal waveform, maintenance of the harmonic relationship between various partials comprising temporal segments of a tone, and introduction of desired musical effects. Yet, the apparatus employs relatively few components for achieving such a high degree of flexibility and control while minimizing those parameters which must be held within critical tolerances.

A typical musical tone normally comprises a number of successive parts. The tones of a nonpercussive instrument, for example, consist of a portion called the steady state during which the waveform is more or less cyclically repetitive or constant, a part preceding the steady state, called the attack transient, and a part following the steady state called the decay transient. During the attack transient, which may itself be comprised of a number of portions, the tone generally increases in magnitude. There may be epochs however, during which the tone may be constant in magnitude or even decreasing during the attack transient. Likewise, during the decay transient the tone is generally decreasing in magnitude; the decay transient is usually longer than the attack transient Percussive tones are characterized by the lack of any epoch even approximately a steady state; there is a very short period of time during which the tone grows in magnitude very rapidly, which we may call the attack, and a rather longer period of time during which the tone generally decreases in magnitude. During the decay transient of any one note of an instrument, there may frequently be epochs during which the magnitude of the tone increases, as with the piano, for example, but the overall trend is a decrease in magnitude of the tone. The decay transient of a percussive instrument is typically longer than that of a nonpercussive instrument. The steady state of nonpercussive instrument may be maintained by the musician for any duration of time, may be changed slowly compared with the period of an individual cycle by the musician, and may, though not necessarily, be of longer duration than the attack transient or even the decay transient. During the attack transient, especially of nonpercussive musical instruments, the waveform may change considerably; the waveform of the steady state may itself change and by cyclically repetitive at a rate slow compared with the frequency of the fundamental. During the decay transient, especially of percussive instruments, the waveform generally changes quite markedly and often pseudorepetitively. The statements made here are not intended to be true with never a violation, but are intended to be generalizations frequently or even usually true. In any case, although the waveforms of the various portions for a single musical tone may differ, all three portions normally bear a certain common quasiperiodicity and are related in some way to each other by belonging to the tone of the instrument of interest. That is, the period of the wave is normally approximately the same for all three portions and, even if changing, is continuous. In addition, the transition from one portion to another is relatively smooth. These conditions have been relatively difficult to synthesize with electronic and electromechanical equipment. Equipment which has been reasonably successful in such synthesis is extremely complex and normally involves the use of a very complex, preprogrammed, nonreal-time electronic computer, as distinguished from the real-time, key-control exercised by a musician playing musical instruments. Accordingly, it is an important object of this invention to provide simple, inexpensive methods and means for synthesizing quasi-periodic complex signal waveforms.

It is another object of the invention to achieve the preceding object in connection with producing signal waveforms corresponding to musical tones while providing immediate real-time control by the musician and permitting changes in the waveform with time.

It is a further object of the invention to achieve the preceding objects with apparatus capable of accurately retaining the harmonic relationship among the different partials of a musical tone.

It is still another object of the invention to achieve the preceding objects while employing relatively few standard, highly stable frequency sources.

It is still a further object of the invention to achieve the preceding objects while facilitating the alteration of the characteristics of the standard frequency sources to achieve desirable musical effects.

It is still a further object of the invention to achieve the preceding objects with a controllable high degree of flexibility in establishing the nature of the signal waveforms produced with but relatively few components in a system where most parameters do not require maintenance within precise tolerances.

According to the invention, there is an electrical representation of a set of related waveforms. The waveforms may be generated in a variety of ways. One of these comprises generating them by superposition of a set of waveforms, called a basis, that are particularly simple to generate by an electrical means, such as oscillators or ring counters. Linear superposition proves to be particularly convenient, and easy and inexpensive to accomplish. The respective waveforms find particular utility if they are related to each other by being the successive waveforms of the corresponding segments of the tones produced by various musical instruments.

In a musical instrument according to the invention, a number of electrical signal sources are provided to produce all of the frequencies required in every tone or note that is to be played. These signals are properly mixed in appropriate combining networks so that frequencies related as the required partials tones of a desired note are supplied to output terminals associated with each keyboard key. A feature of the invention resides in combining the same basis signals in a different manner on the different output terminals to provide different complex waveforms on the different output terminals.

A specific form of the present invention provides a plurality of contacts associated with each playing key and a brush operatively linked to the key for movement relative to the contacts, so that the brush moves across several contacts, and touches them in succession, each time that the playing key is depressed. The electrical networks are constructed to provide the different contacts with different combinations of various signals from the signal sources, and by this means the character of the signal at the moving brush changes progressively during the sounding of a single tone or note. The electrical networks are easily and economically manufactured by the use of printed-circuit techniques, and the resulting structure can be made so compact that the entire tone generator is but slightly larger than the keyboard. Preferably, the networks associated with a single playing key are printed upon a single card, each of these cards being disposed in the instrument near its playing key and connected thereto through an appropriate linkage for moving a brush or brushes across a set of contacts responsive to operation of the key.

In one embodiment of the invention, sine wave oscillators provide a trigonometric basis of sine or cosine waves that may be superposed. Other bases could be provided readily, such as saw-tooth waves, triangular waves, or square waves of various periods. The mathematics of computing the admixture needed to represent an arbitrary waveform becomes particularly simple when the functions forming the basis are orthogonal. A basis in which the constituent functions are harmonically related to each other is particularly convenient not only for calculation but for generation, frequency stabilization, and the sharing of sources with consequent reduction in the number of components needed. In another embodiment there is a source of shift control signals which, with a ring conuter, can provide a set of orthogonal, contiguous, nonoverlapping, rectangular pulses as a basis. These may also be superposed. In the application of the pulse basis, means responsive to shift control signals successively shift a waveform productive signal level from one of a plurality of signal terminals to another to circulate that signal level among the signal terminals. A plurality of amplitude control means couple each of the signal terminals to an output terminal and selectively control signal amplitude transmitted to the output terminal in response to the waveform productive signal level then on the signal terminal coupled thereby.

The means responsive to the control signal may comprise a shift register having a shift input and a bistable stage for each of the signal terminals. Each of the bistable stages provides the waveform productive signal level on the associated one of the signal terminals only when in a first of its two stable states. Means are provided for applying the shift control signals to the shift register shift input to circulate the first stable state among the bistable stages.

Numerous other features, objects and advantages of the invention will become apparent from the following specification when read in connection with the accompanying drawings in which:

FIG. 1 of the drawings is a fragmentary schematic diagram illustrating the general layout and interconnection of parts in one embodiment of this invention;

Figure 3:
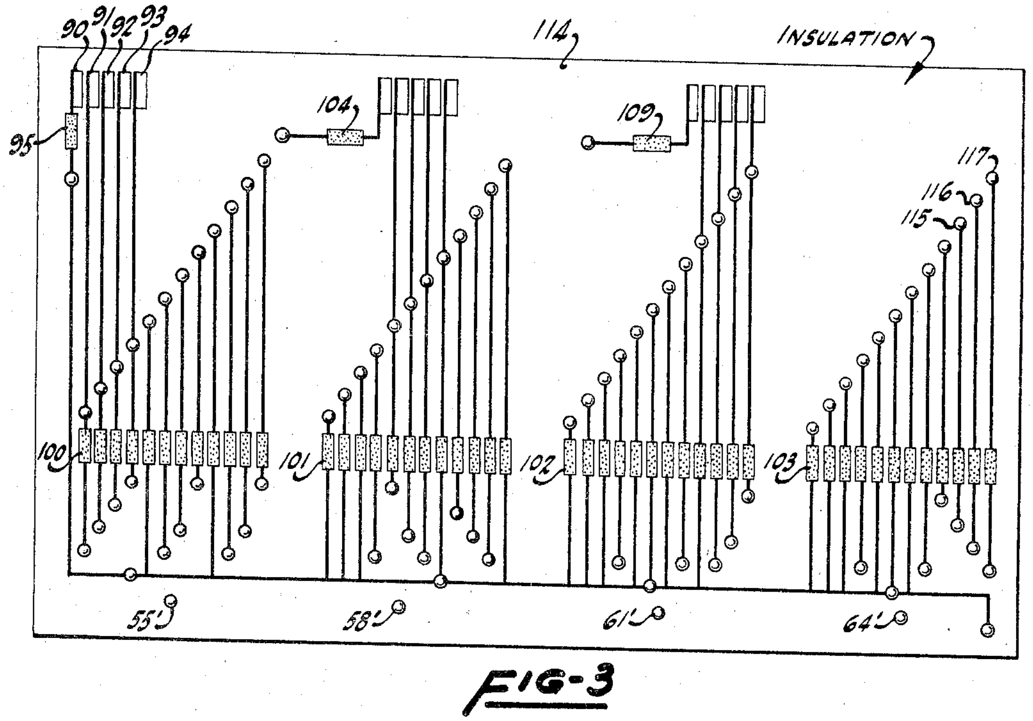
FIG. 3 is a side elevation of a resistance card, showing circuitry printed thereon, illustrating a preferred construction of the network shown in FIG. 2.
Figure 4:
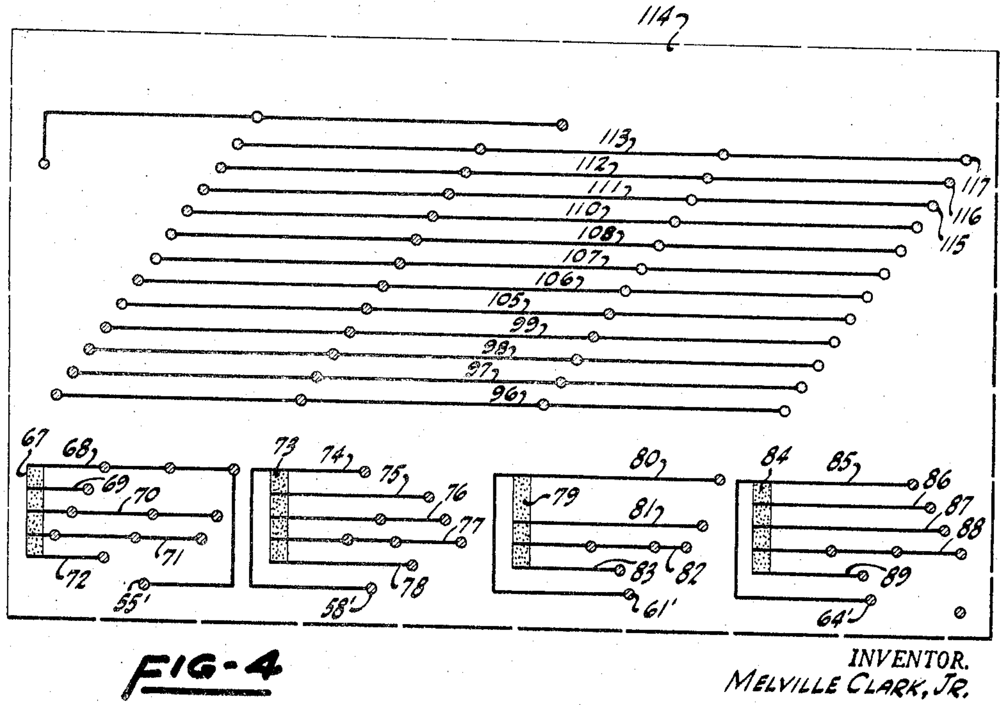
Figure 6:
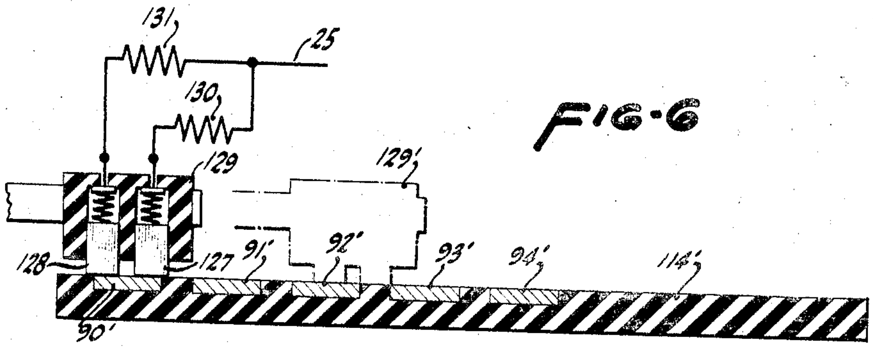
Figure 5:
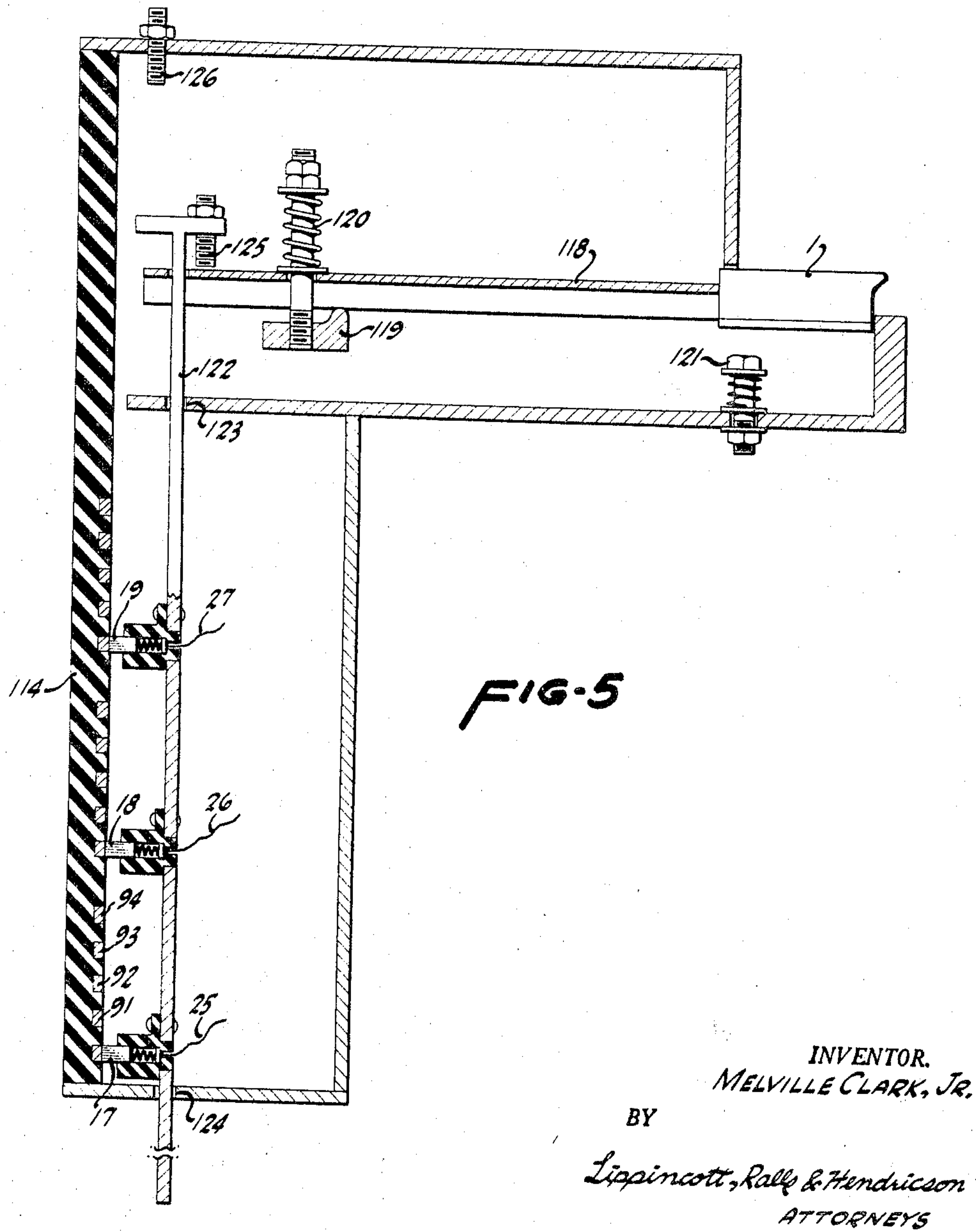
Figure 7:
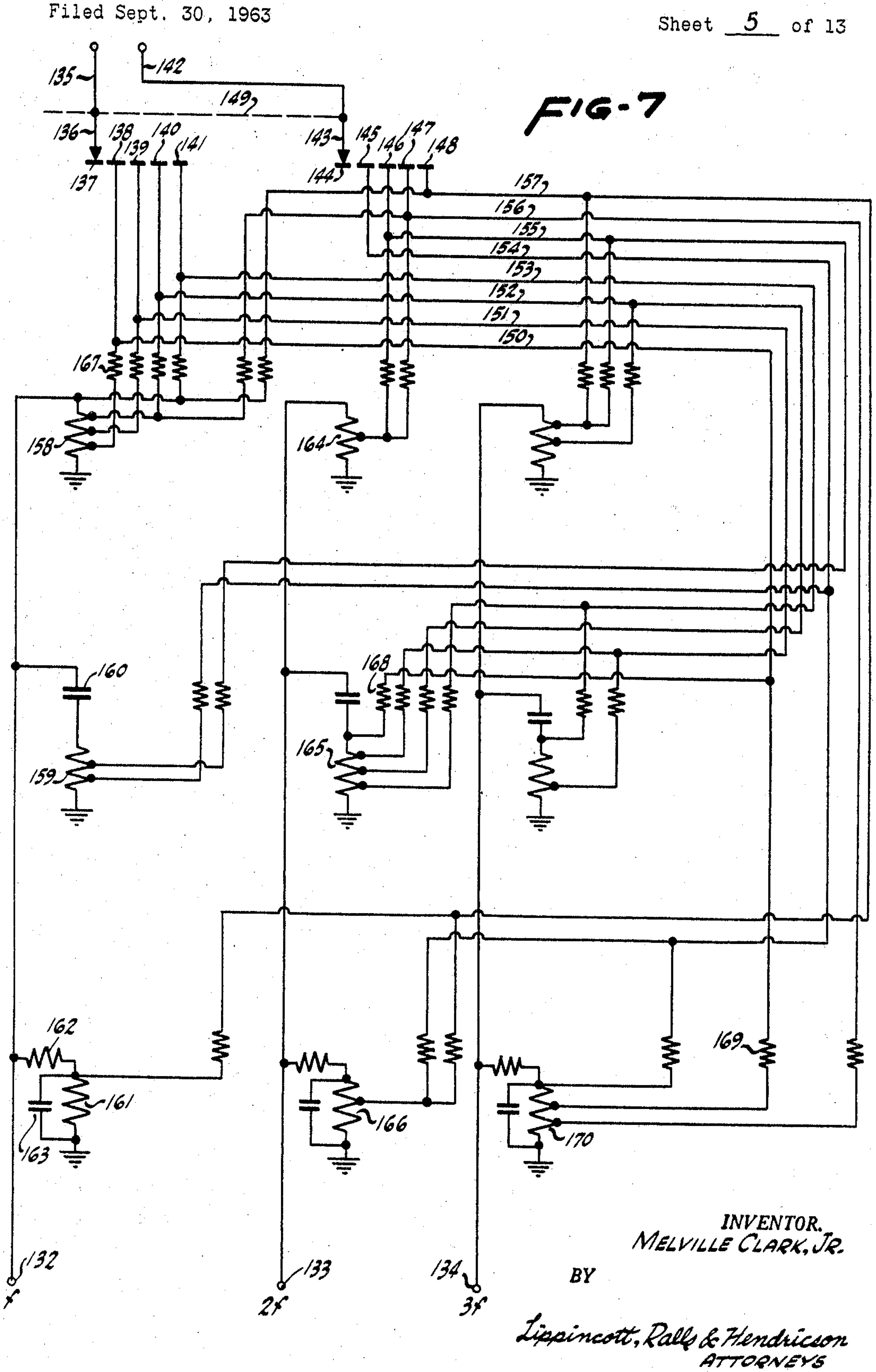
Figure 8:
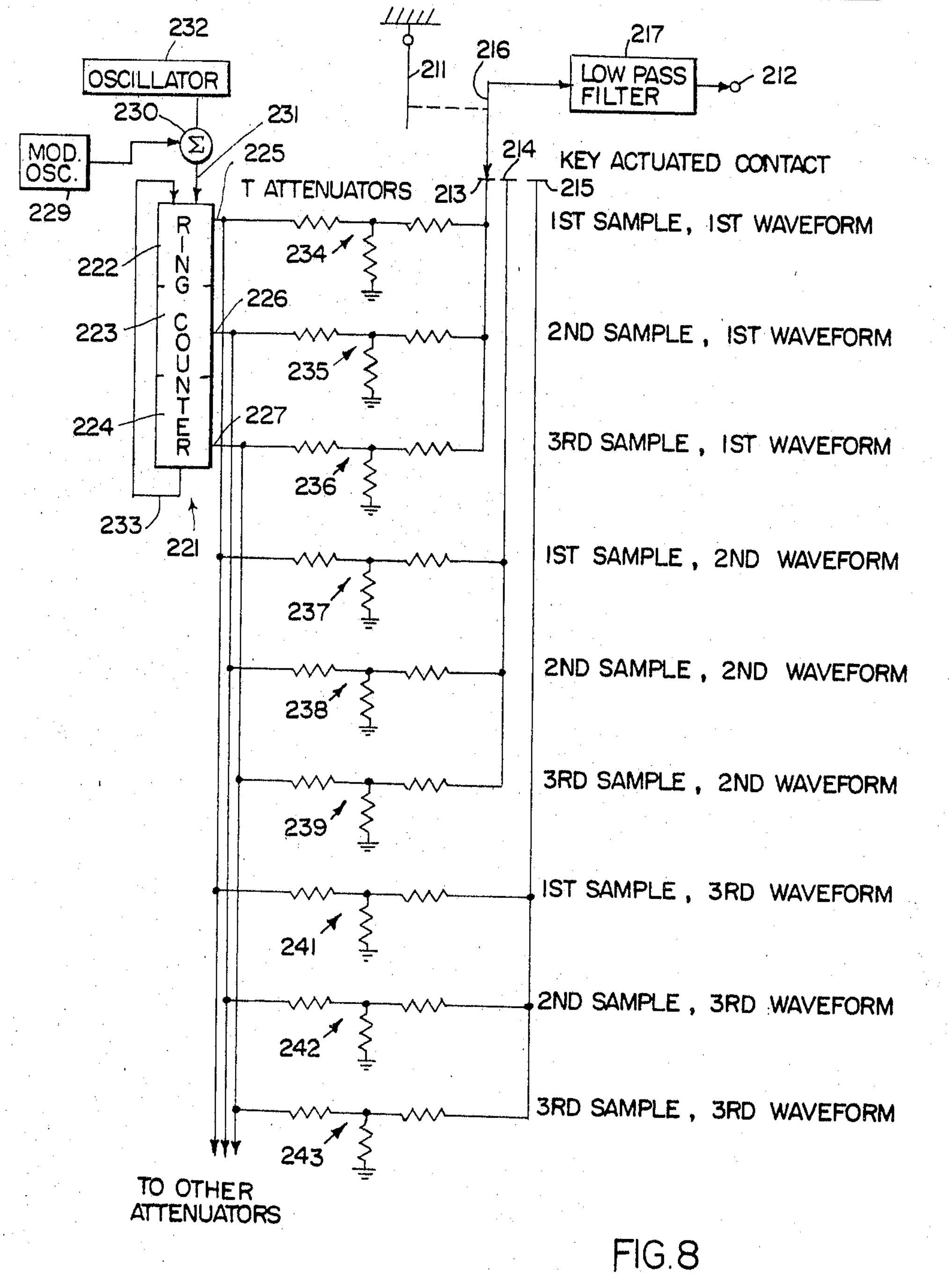
Figure 10:
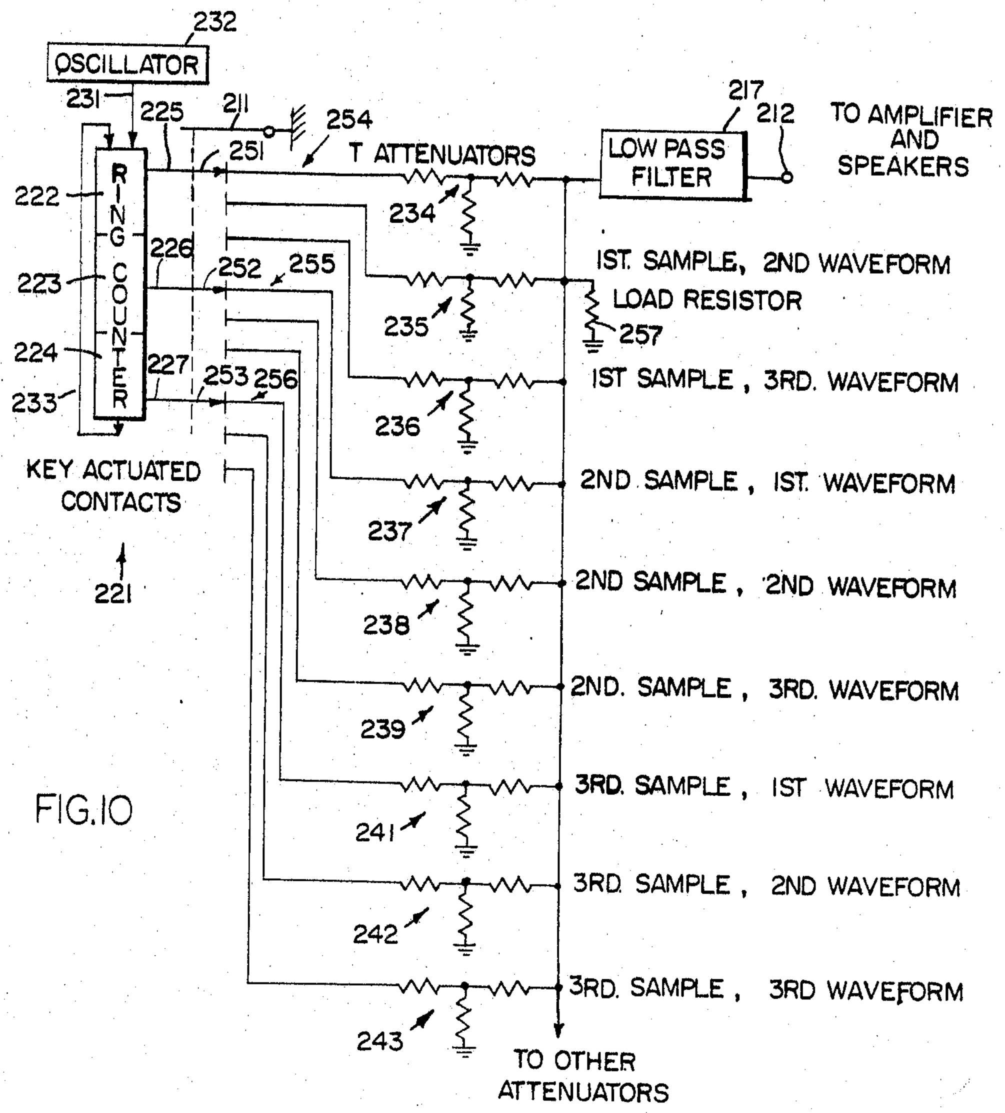
Figure 9:
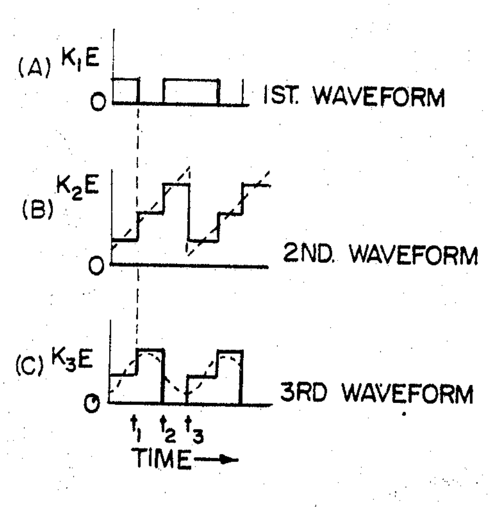
Figure 11:
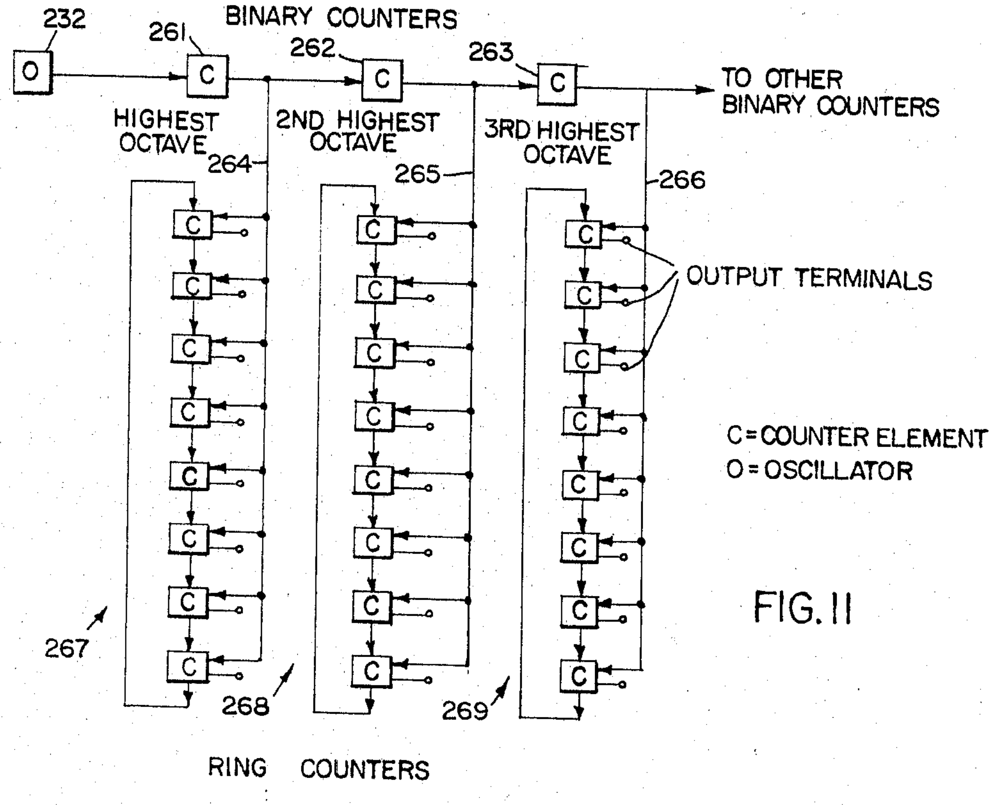
Figure 14A:
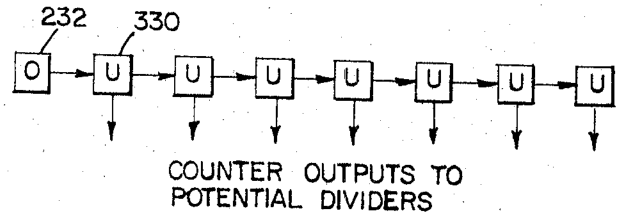
Figure 14B:
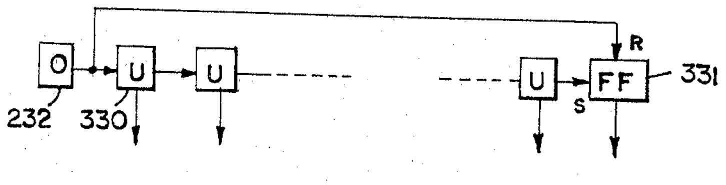
Figure 12:
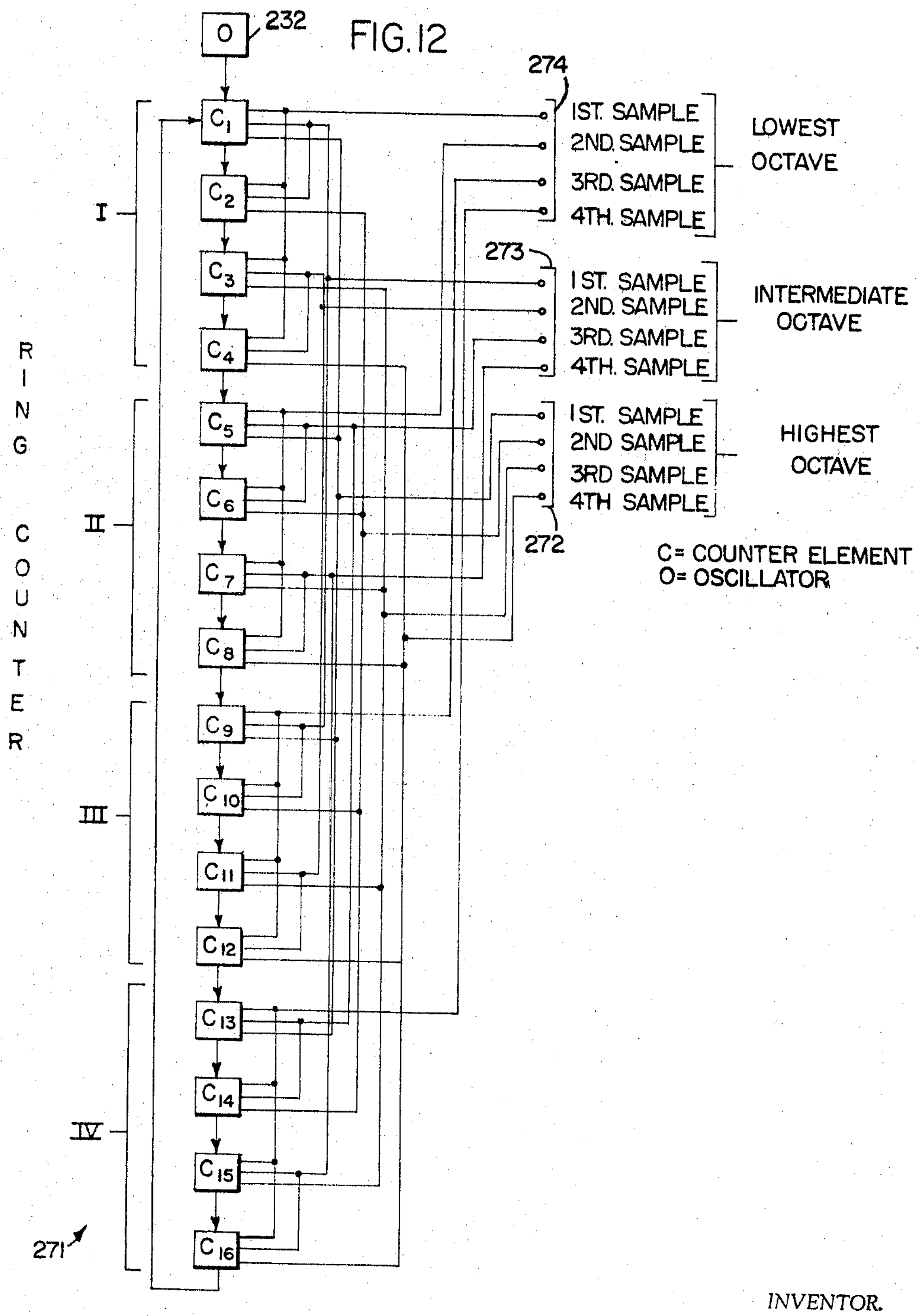
Figure 13:
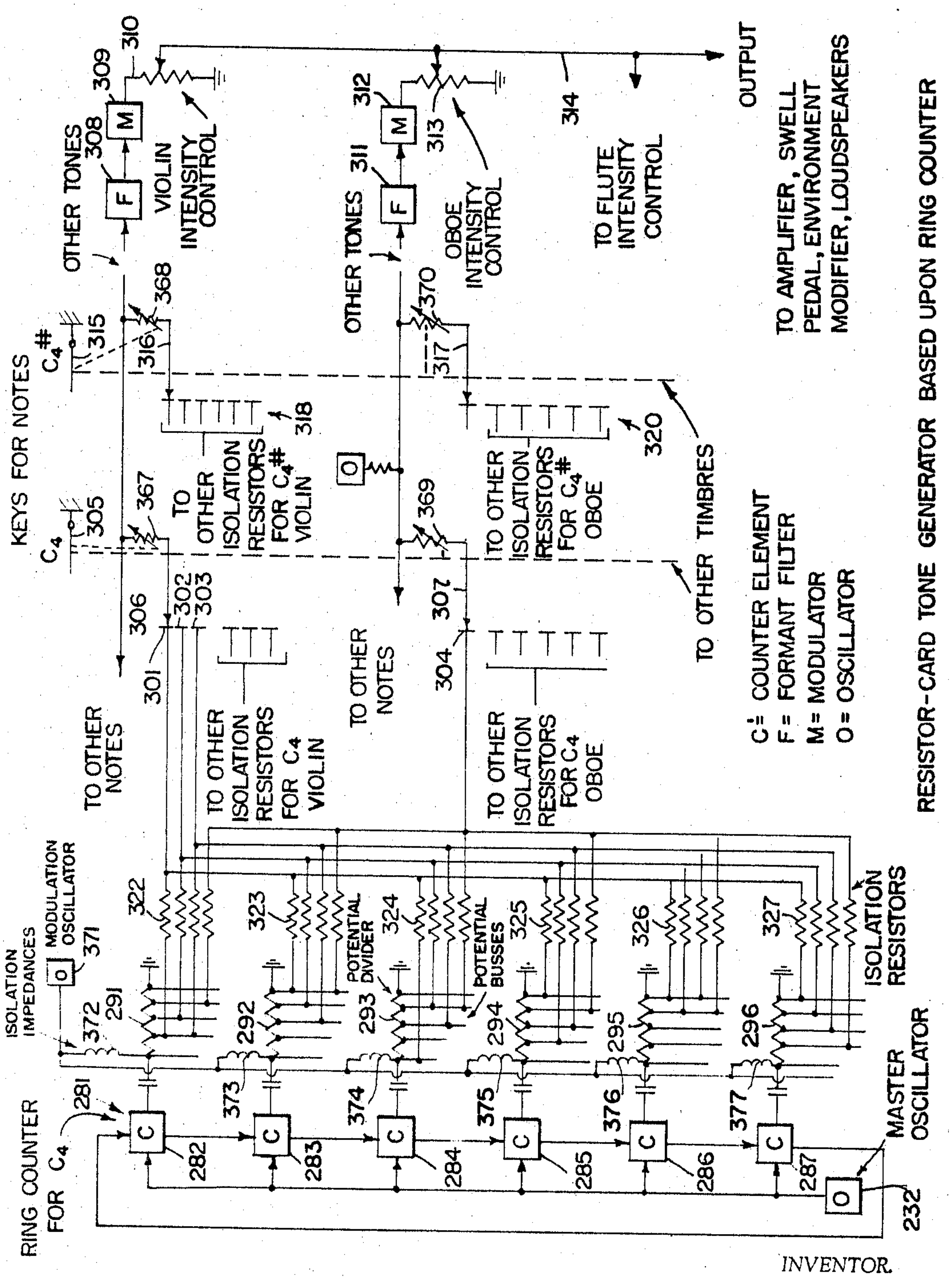
Figure 15:
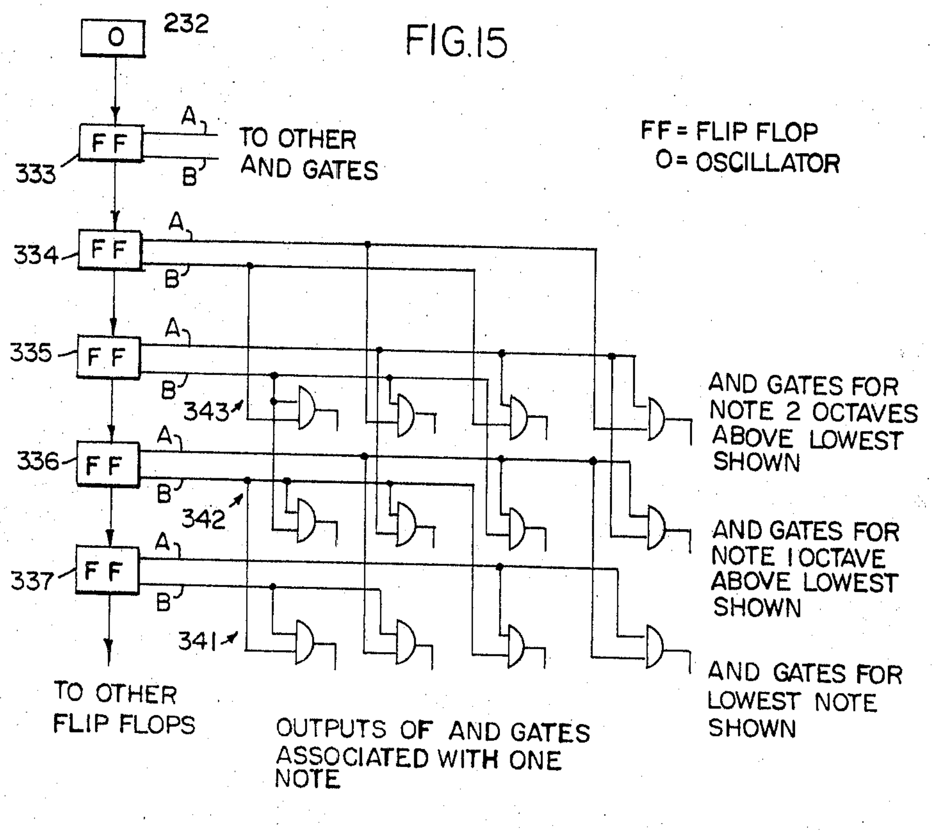
Figure 18:
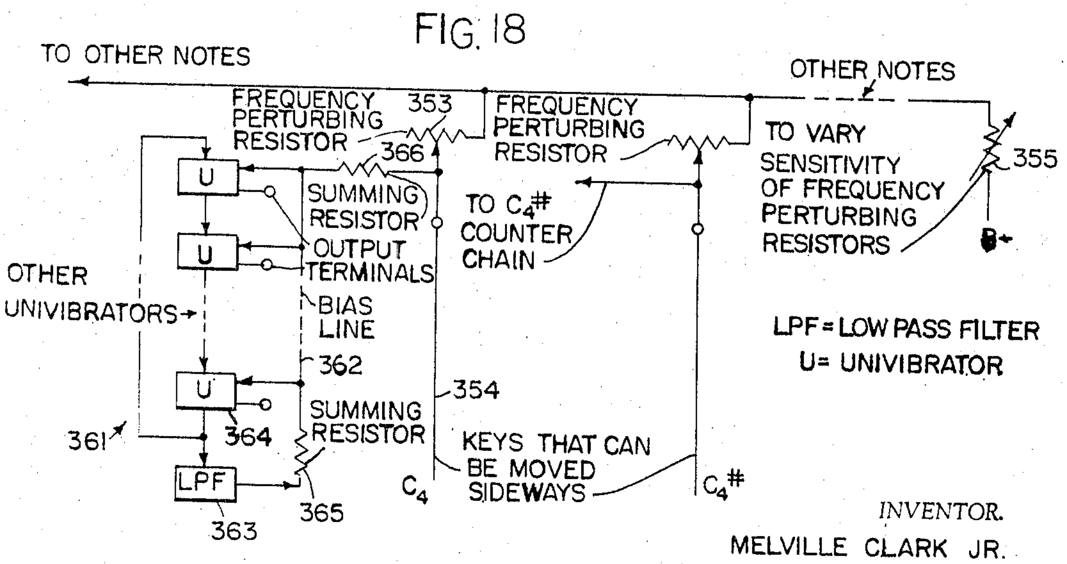
Figure 16:
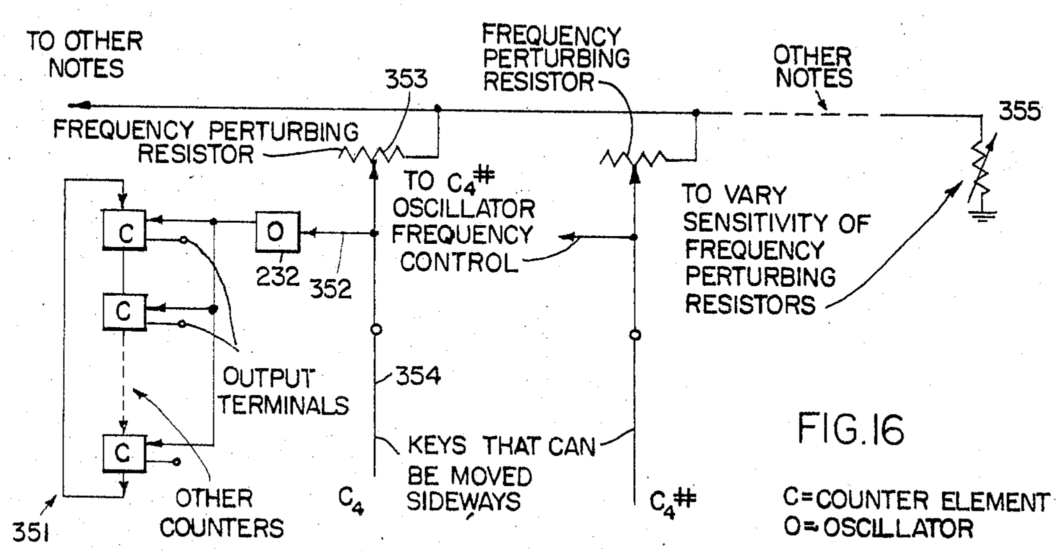
Figure 17:
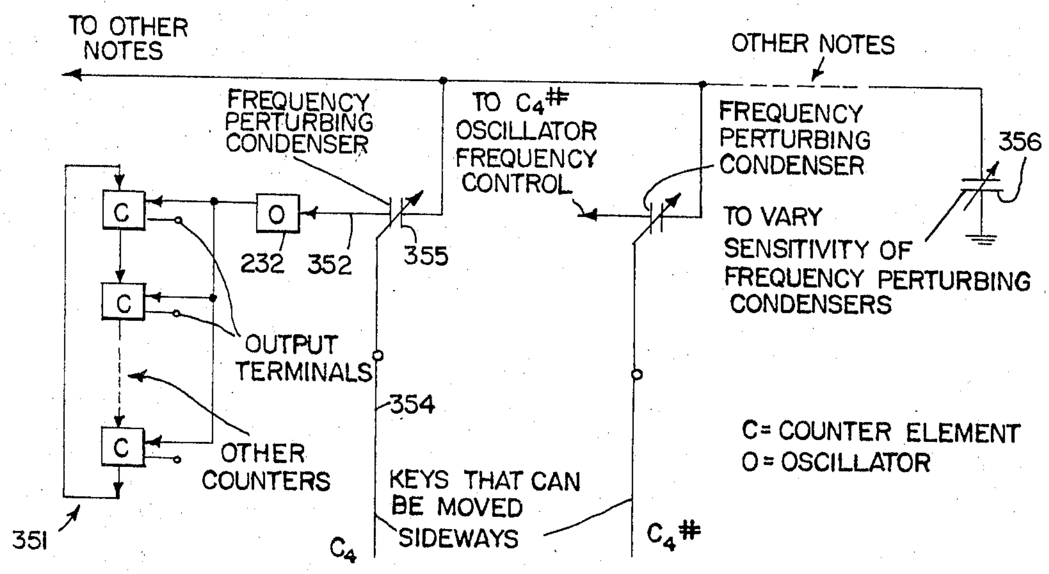
Figure 19:
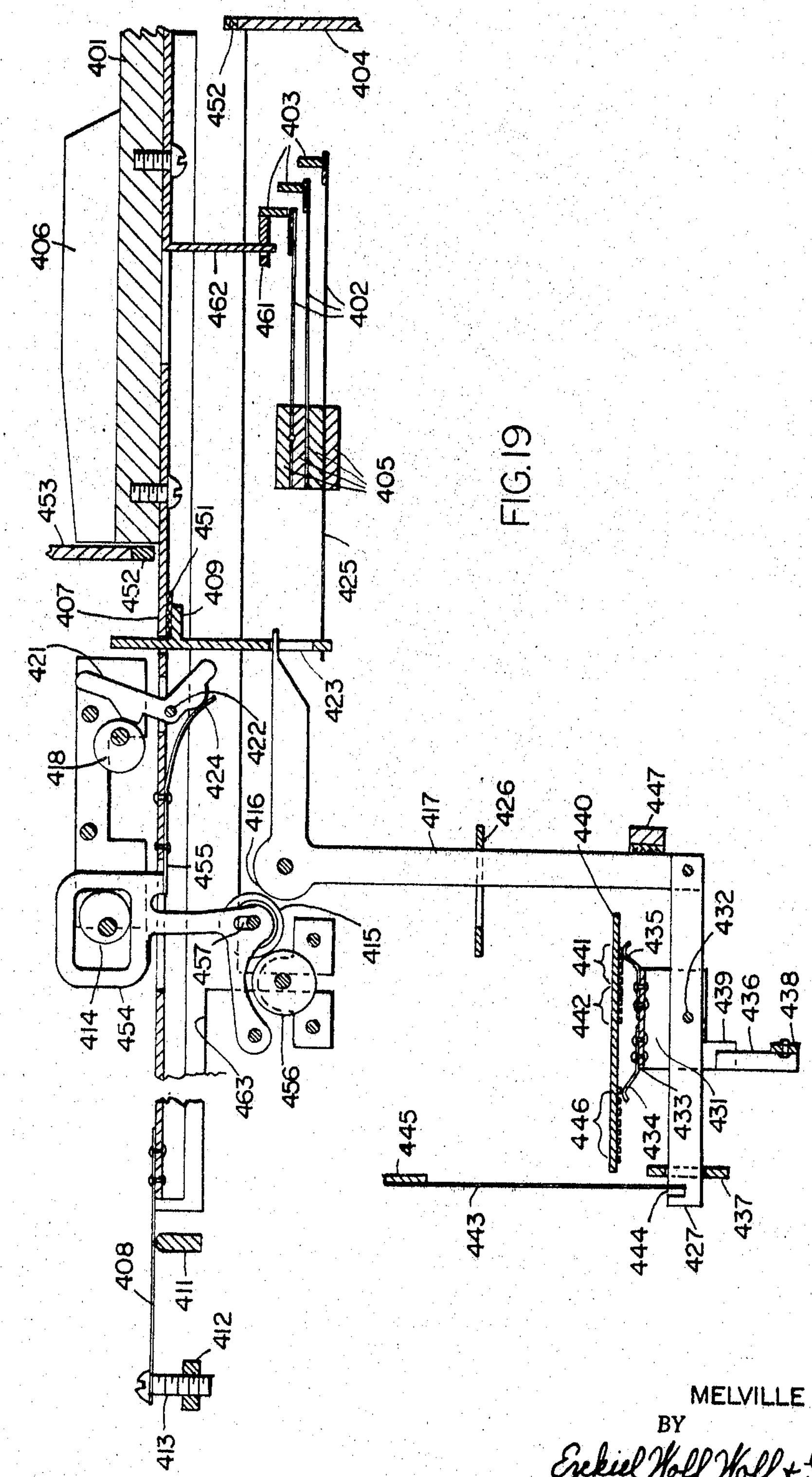

FIG. 4 is an elevation of the circuitry printed upon the opposite side of the same card, this circuitry being shown as it would appear to an observer looking through the card from the side shown on FIG. 3 if the card were transparent or cut away, a broken line indicating the outline of the card, the view being taken in this manner to facilitate a comparison of FIGS. 3 and 4 and particularly the interconnections therebetween which take the form of rivets (appearing in cross-section in FIG. 4) extending through the card;

FIG. 5 is a somewhat schematic, side elevation, partly in section, illustrating a simple form of linkage between a playing key and a set of brushes in the same musical instrument;

FIG. 6 is a section view showing a modified brush arrangement;

FIG. 7 is a fragmentary, circuit diagram of a modified selector network;

FIG. 8 is a combined block-schematic circuit diagram of an embodiment of the invention suitable for producing musical tones by combining rectangular pulses;

FIG. 9 displays the quantized waves that may be created by a rudimentary system that provides three samples during a cycle of the fundamental;

FIG. 10 is a combined block-schematic circuit diagram of a variation of the embodiment of FIG. 8;

FIG. 11 is a block diagram of a system according to the invention for activating a number of ring counters which produce harmonically related complex signal waveforms;

FIG. 12 illustrates a technique for using a single ring counter to produce harmonically related trains of signal pulses;

FIG. 13 is a combined block-schematic circuit diagrams of an embodiment of the invention for producing musical tones employing relatively easy to fabricate resistor cards;

FIG. 14 shows a block diagram of an oscillator-synchronized serial counter chain comprising cascaded monostable elements, and FIGS. 14A and 14B show alternate forms of such a chain embodying cascaded univibrators;

FIG. 15 shows a block diagram of the logical arrangement of a system employing AND gates to reduce the number of counters required;

FIG. 16 is a combined block-schematic circuit diagram of a means for key control of the perturbation of the control oscillator frequency effected by varying a frequency-controlling impedance;

FIG. 17 illustrates a means similar to that shown in FIG. 16 in which frequency perburation is effected by varying a frequency-controlling capacitor;

FIG. 18 illustrates a technique for key controlled frequency perturbation by altering the bias line of monostable elements comprising the counter; and FIG. 19 shows a means for controlling the intensity of each note by adjustment of the depth of depression of each key.

Figure 1:
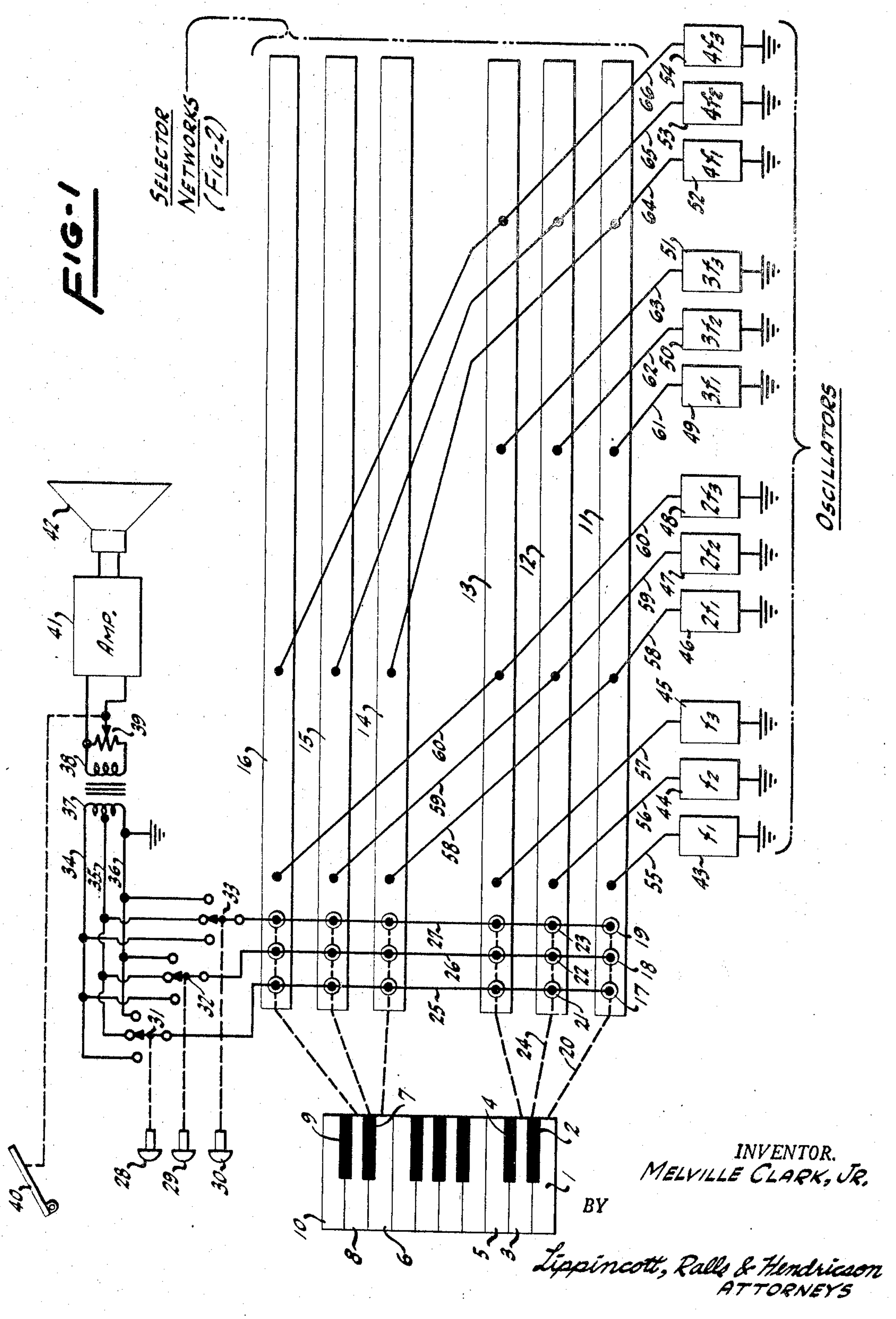

Referring now to FIG. 1, the instrument comprises a plurality of playing keys 1, 2, 3, 4 and 5 and, in the next octave, 6, 7, 8, 9 and 10, and as many more as may be desired. Typically, the complete keyboard may have about 72 playing keys arranged as in the keyboard of a piano, one key for each note of the musical scale. Additional keyboards or manuals may be provided, and also foot-operated keys or pedals, as in organs. Because the addition of more keys requires only the addition of duplicate parts and obvious interconnections, the smaller number of keys illustrated is adequate for an understanding of how an instrument of any desired size can be constructed and operated.

For each keyboard key, there is a selector network which usually takes the form of a circuit printed upon a card. In FIG. 1, a few of these selector networks are represented by the blocks 11, 12, 13, 14, 15 and 16. Contacts on or connected to each network cooperate with movable brushes mechanically linked to the various playing keys. For example, three sets of contacts on card 11 (see FIGS. 2 and 3) cooperate with three brushes 17, 18 and 19, connected through a mechanical linkage 20 to playing key 1. Contacts on card 12 cooperate with brushes 21, 22 and 23, connected through a mechanical linkage 24 to playing key 2, and so forth.

As will be explained more fully hereinafter, the different contacts are supplied with different combinations of frequencies corresponding to partial tones, and each brush moves across a different plurality of contacts responsive to operation of the associated playing key. To be more specific, card 11 is provided with three sets of contacts: one set cooperates with each of the three brushes 17, 18 and 19. The frequencies supplied to each set of contacts on card 11 correspond to partials of musical notes or tones of the same pitch—that is, the pitch of the note corresponding to playing key 1 of the keyboard. However, each set of contacts is supplied with a different combination of these partials, and therefore the signals at the different contact sets represent different timbres.

For example, the signals supplied to the contacts associated with brush 17 may have a violinlike timbre, those supplied to the contacts of brush 18 may have a cellolike timbre, and those supplied to the contacts of brush 19 may have a French hornlike timbre. Hence, depression of key 1 provides three timbres of the same note simultaneously.

Corresponding brushes associated with all of the keys are electrically connected together and to a common bus, which thus carries all signals of every pitch or note having a particular timbre or tone color. Thus, brushes 17 and 21, and all other brushes cooperating with contacts supplied with a violinlike combination of partial tones, are electrically connected to bus 25. Similarly, brushes 18 and 22, and all other brushes cooperating with contacts that are supplied with a cellolike combination of partial tones, are connected to bus 26. Brushes 19 and 23, and all other brushes for the French hornlike timbre, are connected to bus 27.

The signals of different timbre are combined in adjustable proportions by means of a stop-operated switching system. A plurality of manually operated stops 28, 29 and 30 are provided, so that the player can select the timbres that are to be reproduced. These stops operate the arms of three selector switches 31, 32 and 33, which are connected to the three buses 25, 26 and 27, respectively. Each of the three selector switches has a plurality of contacts connected to buses 34, 35 and 36, as shown, and the last-mentioned three buses are connected to different taps or terminals of the transformer primary 37. When stop 28 is pushed fully in (to the right in the drawing), it is evident that bus 25 will be connected to bus 36, and substantially none of the violinlike timbre is delivered to the transformer secondary 38. On the other hand, when stop 28 is pulled fully out (to the left), bus 25 is connected to bus 34, and the maximum amount of violinlike timbre is supplied to the transformer secondary 38. By manipulation of the three stops 28, 29 and 30, it is evident that the three timbres may be combined in various proportions for simulating any one or combination of the three instruments represented.

The transformer secondary 38 is connected to a volume control 39 operated by a swell pedal 40, which controls the overall loudness of the reproduced tone. A conventional amplifier 41 is provided to step up the power of the electric signals to an adequate level for driving the loudspeaker 42, which converts electric signals into sound.

The selector networks must be provided with signals of all the frequencies required to synthesize the desired complex tones. Seven or eight harmonically related partials are usually required for each pitch or note within the range of the instrument, except that at the upper end of the scale the number of partials may be somewhat reduced. However, the number of different frequencies required is greatly reduced by the harmonic relation of the partials, whereby the same frequency may be employed as the fundamental for one note, the second harmonic for the note one octave lower, etc. Thus, about 100 different frequencies will suffice for a 72-keyboard instrument. Preferably, each of the needed frequencies is provided by an essentially single-frequency source of electric signals, which may be a transistor oscillator, for example. All of the oscillators may be independently tuned, or the oscillators for harmonically related frequencies can be coupled together in frequency-divider chains, as is well known.

In FIG. 1, twelve of the oscillators are represented by blocks numbered 43 through 54, inclusive. Oscillators 43, 44 and 45 supply frequencies corresponding to the fundamental of the notes played by keys 1, 2 and 3, respectively. Hence, oscillator 43 is connected by bus 55 to an input terminal of selector network 11, oscillator 44 is connected by bus 56 to an input terminal of selector network 12, and oscillator 45 is connected by a bus 57 to an input terminal of selector network 13. Oscillators 46, 47 and 48 are tuned to the second-harmonic frequencies of the notes played by keys 1, 2 and 3, respectively. These same frequencies are the fundamentals of the notes played by keys 6, 7 and 8, respectively. The appropriate connections are made by buses 58, 59 and 60. Oscillators 49, 50 and 51 supply the third-harmonic frequencies to networks 11, 12 and 13 through buses 61, 62 and 63. Oscillators 52, 53 and 54 supply the fourth-harmonic frequencies to networks 11, 12 and 13, and also supply the second-harmonic frequencies to networks 14, 15 and 16, through buses 64, 65 and 66. The tuning and connections of the other oscillators needed to complete the musical instrument will be obvious to those skilled in the art, and therefore will not be described.

Figure 2:
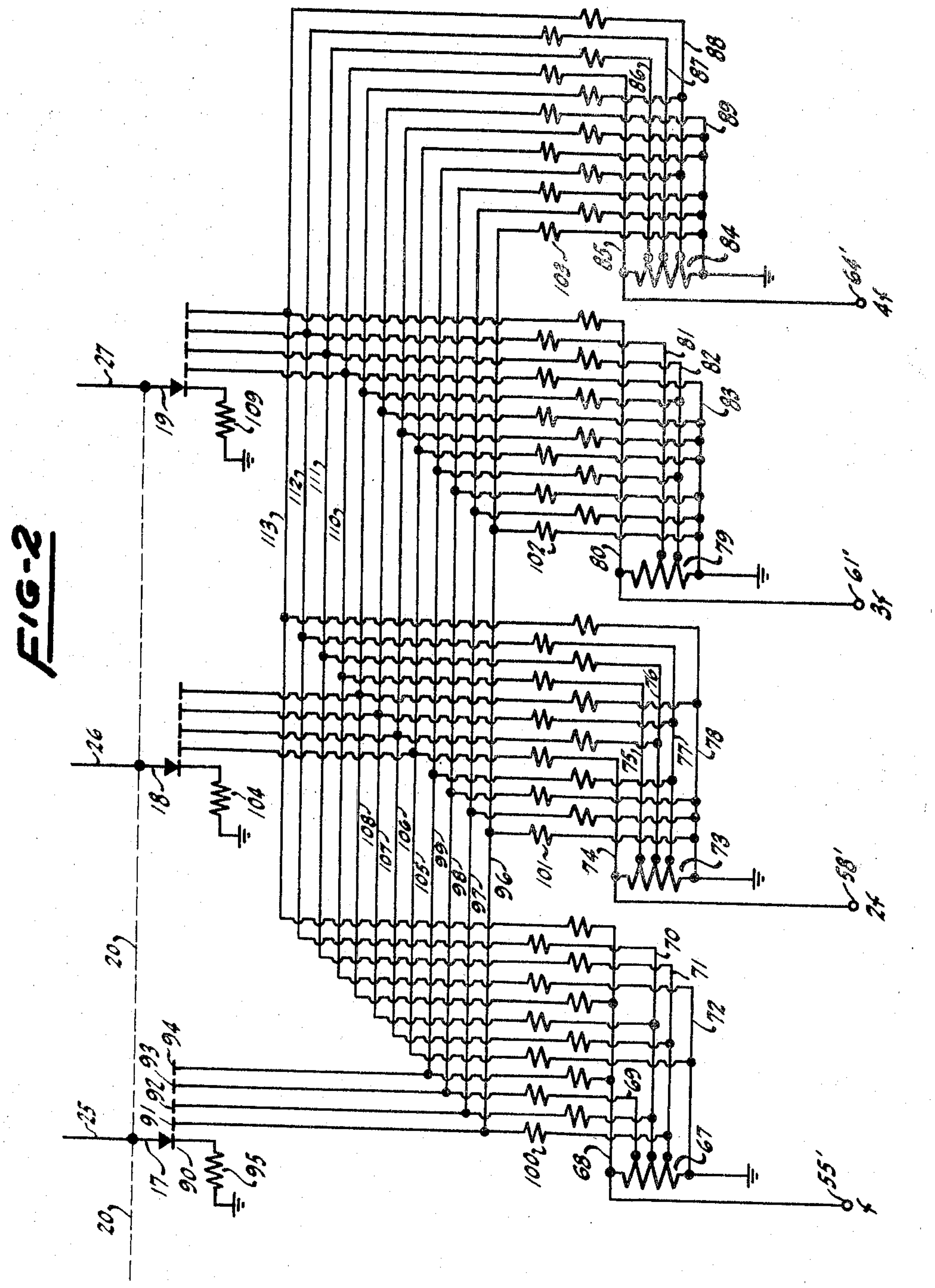
FIG. 2 is a fragmentary circuit diagram of one selector network employed in the embodiment shown in FIG. 1.

FIG. 2 is a fragmentary circuit diagram of one selector network. Circuits for the other selector networks will be essentially the same and can be identical, although some variation from note-to-note may be desirable for aesthetic purposes. The input terminal receiving the fundamental-frequency signal, e.g., from bus 55, is designated by reference number 55'; the input terminal receiving the second-harmonic frequency, e.g. from bus 58, is designated 58'; the input terminal receiving the third-harmonic frequency, e.g. from bus 61, is designated 61'; and the input terminal receiving the fourth-harmonic frequency, e.g. from the bus 64, is designated 64'. Provisions for higher harmonics may be added, and usually are added, simply by extending the network to the right to provide additional input terminals and connections thereto in like manner to the input terminals illustrated.

Each input terminal is connected to a different resistance voltage divider having a plurality of taps. Thus, input terminal 55' is connected to voltage divider 57 provided with a plurality of taps connected to buses numbered 68 through 72, inclusive. It is evident that the last-mentioned five buses receive different amplitudes of the fundamental-frequency signal, the full amplitude being received by bus 68 and substantially zero amplitude or no signal being present on the grounded bus 72. Similarly, terminal 58' is connected to a voltage divider 73 having a plurality of taps connected to buses numbered 74 through 78, inclusive, terminal 61' is connected to a voltage divider 79 having a plurality of taps connected to buses numbered 80 through 83, inclusive; and terminal 64' is connected to a voltage divider 84 having taps connected to buses numbered 85 through 89, inclusive. Hence, the buses at the bottom of FIG. 2 provide a large number of signals representing different amplitudes of the different partials which may enter into various notes of the same pitch.

At the top of FIG. 2, the three brushes connected to buses 25, 26 and 27 are schematically represented at 17, 18 and 19. These three brushes are mechanically connected to move in unison upon operation of the playing key to which they are connected through mechanical linkage 20. Brush 17 cooperates with a set of five contacts, numbered 90 through 94, inclusive, which are linearly aligned and uniformly spaced apart so that brush 17 touches each contact in sequence as it moves from left to right. Contact 90 is grounded through resistor 95; brush 17 touches this contact in its rest position and no signal is transmitted to bus 25. Contacts 91, 92, 93 and 94 are connected to buses 96, 97, 98 and 99, respectively, and thus receive whatever signals are supplied to these buses. Thus, as brush 17 moves from left to right, it transmits to brush 25, first, whatever signals are supplied to bus 96, then, whatever signals are supplied to bus 97, then whenever signals are suppled to bus 98, and finally, provided the brush moves the full distance that it can travel, whatever signals are supplied to bus 99. Hence, the amplitude and waveform of the signals supplied to bus 25 are independently determined, at a plurality of points in the travel of the brush, by the particular combinations of signals supplied to the four buses 96 through 99.

Bus 96 can be supplied with any combination of the signals appearing on the various supply buses connected to the four voltage dividers at the bottom of FIG. 2. This is accomplished merely by connecting bus 96 to the appropriate supply buses through isolating resistors. For example, in the network illustrated, bus 96 is connected to bus 71 through the isolating resistor 100, is connected to bus 78 through the isolating resistor 101, is connected to the bus 83 through the isolating resistor 102, and is connected to the bus 89 through the isolating resistor 103. The resulting composite signal at bus 96 consists of a small-amplitude component of the fundamental frequency, and zero-amplitude components of the second, third, and fourth harmonic frequencies. In other words, the signal at bus 96 is of small amplitude, and is an essentially pure tone of the fundamental frequency only. This is the signal first transmitted to bus 25 as brush 17 moves away from its rest position and touches contact 91.

Similarly, any desired combination of signals from the supply buses can be applied to each of the buses 97, 98 and 99 by appropriate connections through isolating resistors. With the connections illustrated, buses 97 and 98 also receive only the fundamental component, but with a progressively increasing amplitude so that the tone represented at bus 25 progressively increases in loudness as brush 17 moves across contacts 91, 92 and 93. Bus 99 received the largest-amplitude fundamental component, and also receives small-amplitude components of the second, third, and fourth harmonics. Hence, when brush 17 touches contact 94, the signal at bus 25 not only approaches maximum loudness, but also becomes richer in harmonic structure, and thus changes considerably in character.

The first one of the five contacts cooperating with brush 18 is connected to ground through resistor 104, and the next four contacts of the same set are connected to buses 105, 106, 107 and 108, respectively. Each of the last mentioned buses can be connected through isolating resistors to any desired combination of the supply buses shown at the bottom of FIG. 2. As brush 18 moves from left to right, an electric signal is transmitted to bus 26 which varies in character from one moment to the next in a manner quite different from the tone represented by the signal at bus 25, because of differences in the connections between the contacts and the supply buses. Thus, the two signals appearing at buses 25 and 26 represent tones of different timbre and have different temporal patterns of change in timbre or tone color, but are of the same pitch because both signals are made up from combinations of the same partials and have the same fundamental frequency.

The first one of the five contacts associated with brush 19 is connected to ground through resistor 109, and the next four contacts are connected to buses 110, 111, 112 and 113, respectively. As before, the buses connected to the contacts are connected through isolation resistors to any desired combination of the supply buses, and a third timbre pattern is provided by the signal supplied to bus 27. By extending the network and providing additional brushes cooperating with additional sets of contacts, as many different timbre patterns as one may desire can be provided.

A preferred manner of constructing the selector network is illustrated in FIGS. 3 and 4. Using known printed-circuit techniques, the buses and connecting leads are "printed" upon the two sides of a card or board 114 of insulating material, some buses and leads being printed upon one side of the card and some upon the other to maintain insulation between leads and buses that cross. Connections between leads and buses on one side of the card and leads and buses on the other side of the card, where needed, can be made by rivets or the like passing through the card, as shown at 115, 116 and 117, for example. The network resistors can be made by the known technique of spraying resistive material through a mask or template onto the insulating board 114. Fortunately, close tolerances are not required and the necessary accuracy is easily achieved. The electrical contacts cooperating with the brushes, e.g., contacts 90 through 94, can be mounted directly upon card 114, or alternatively can be mounted separately and connected by conventional wiring to appropriate terminals on the printed-circuit card.

Various forms of mechanical linkage can be used between the playing keys and brushes. I prefer a linkage that provides a touch-sensitive keyboard—that is, one in which the loudness or other characteristic of the tone produced varies with the force with which the playing key is struck. A simple example of such a linkage is illustrated in FIG. 5. The playing key 1 is fastened to the end of a key channel 118, which rocks upon a fulcrum at 119 and is biased to the rest position by a spring 120. A bottoming stop 121 limits the downward travel of the key. A metering bar 122 is slidably mounted in a pair of guide slots 123, 124, and is provided with a part—e.g., screw 125—at its upper end which rests upon the key channel 118 so that bar 122 is raised when key 1 is depressed.

If the playing key is struck lightly so that it moves down slowly, bar 122 is merely raised by an amount proportional to the downward travel of the key. But if the playing key 1 is struck more forcefully, bar 122 is thrown upward an additional amount proportional to the speed of depression of the playing key. Hence, the distance that bar 122 travels upward is variable under control of the player, and this in turn varies the character of the tone produced. The maximum upward travel of bar 122 is limited by a stop 126.

The three brushes 17, 18 and 19 are mounted upon bar 122, as shown, and travel upward in unison with the metering bar. When the key is struck very hard, the brushes travel the maximum distance upward and each brush touches all of the contacts in its cooperating set—i.e., brush 17 moves across contacts 91, 92 and 93 to contact 94, in succession, and then back again. When the playing key is struck more lightly, the brushes travel upward a lesser distance—e.g., brush 17 may travel upward only as far as contact 92.

Other and more complicated linkages between the playing key and the brushes may be employed. An example is the linkage shown in FIG. 8 of my article, "Keyboard Musical Instrument," published in The Journal of the Acoustical Society of America, April 1959, at page 409, it being understood that the optical shutter there shown would be replaced by a bar carrying the brushes 17, 18 and 19.

Still referring to FIG. 5, it will be noted that the five contacts of each set, e.g., contacts 90 through 94, are linearly aligned and uniformly spaced apart, the spacing between adjacent contacts being approximately equal to the width of brush 17 so that the brush touches the contacts, one at a time, in uninterrupted succession. Nevertheless, there is an abrupt change in the character of the tone each time that the brush passes from one contact to the next. These abrupt changes can be smoother considerably by means of the modification illustrated in FIG. 6.

Referring to FIG. 6, the five contacts 90', 91', 92', 93' and 94' are mounted on the insulating member 114'. Instead of a single brush cooperating with these contacts, there are two brushes, 127 and 128, mounted in holder 129, as shown so that the two brushes move in unison. A moved position of the brush holder and two brushes is shown in broken lines at 129'. The contacts 90' through 94' are spaced apart so that the distance between adjacent contacts is approximately equal to the width of one brush, and the two brushes 127 and 128 are spaced apart in the direction of their motion by an amount such that the distance between centers of the brushes is approximately one-half of the distance between adjacent contacts. Hence, the two brushes pass from one contact to another at different times, and the signal at one brush changes while the signal at the other is fairly steady. An average of the two signals is supplied to bus 25, e.g., by means of averaging resistors 130 and 131 connected as shown.

It has often been said that the sound of a musical tone is determined only by the frequencies and amplitudes of its partials, and not by the phase relations between the partials. This appears to be substantially true for steady-state tones, but not for the transient portions of a tone. Hence, for faithfully reproducing transient effects, it will be desirable to provide, at the supply buses of each selector network, not only different amplitudes of each harmonic frequency, but also different phases of the several frequency components. With the present invention this is readily accomplished, at the expense of some increase in the size and complexity of the selector networks.

Refer now to FIG. 7, which is a fragmentary circuit diagram of a selector network for combining three component frequencies in various amplitudes and phases. (Additional frequencies can be added by obvious extension of the network.) Input terminals 132, 133 and 134 are provided for receiving the fundamental, second-harmonic, and third-harmonic frequencies, respectively. An output bus 135 is supplied by a brush 136 cooperating with a set of five contacts 137, 138, 139, 140 and 141. A second outbut bus 142 is supplied by a brush 143 cooperating with a set of five contacts numbered 144 through 148, inclusive. The two brushes are linked together, and to a playing key, by any appropriate linkage, represented by broken line 149. As in the previously described embodiment, the several contacts are individually connected to a plurality of buses, identified by reference numbers 150 through 157, inclusive.

Input terminal 132 is connected drectly to a voltage divider 158 having a plurality of taps at which different amplitudes of the fundamental-frequency signal can be obtained, as hereinbefore explained. Also connected to terminal 132 is another tapped voltage divider 159, this voltage divider being connected to the input terminal through a phase shifter comprising capacitor 160, whereby the potentials available at the taps of divider 159 are advanced in phase about 90° relative to the potentials available at the taps of divider 158. A third voltage divider 161 is connected to input terminal 132 through a phase shifter comprising resistor 162 and capacitor 163, which retards the phase of the voltages available from divider 161. Thus, the fundamental frequency is available at the taps of three voltage dividers in a variety of amplitudes and also in a variety of phases.

Similarly, input terminal 133 is connected to voltage divider 164 directly, is connected to voltage divider 165 through a phase shifter which advances the phase, and is connected to voltage divider 166 through a phase shifter which retards the phase. Thus, the second-harmonic frequency is available in a variety of amplitudes and a variety of phases. In a similar manner, all other harmonic frequencies can be made available in both a variety of amplitudes and a variety of phases.

The buses 150 through 157 are individually connected to different combinations of voltage divider taps through isolating resistors. For example, bus 150 is connected through isolating resistor 167 to a tap of divider 158, which supplies a reference-phase fundamental component; is connected through resistor 168 to divider 165, which supplies an advanced-phase second-harmonic component; and is connected through resistor 169 to divider 170, which supplies a retarded-phase third-harmonic component. Thus, the composite signal at bus 150 (and, hence, at contact 138) has a fundamental component of the reference phase, a second-harmonic component of an advanced phase, and a third-harmonic component of a retarded phase. The other buses are connected according to similar principles, and by this means any desired combination of the component frequencies, in any desired amplitude and phase relation, can be obtained at each contact associated with the brushes.

With reference now to FIG. 8, there is shown a combined block-schematic circuit diagram of an exemplary embodiment of the invention for synthesizing complex signal waveforms. Depressing key 211 produces a sequence of complex waveforms on waveform output terminal 212. The sequence of waveforms may correspond to various parts of a tone of a nonpercussive musical instrument. (In general more than three segments would be required.) The sequence shown may correspond to segments from the attack and at least one for the steady state. Indeed, more than one steady state contact may be provided to permit the intensity of the steady state to be changed by altering the depression of a key. The waveforms could be changed to correspond to the changes in the waveform of a steady state with intensity. The decay can be provided in two ways: By a mechanism similar to that shown in FIG. 8 of J. Acoust. Soc. Amer., 31, 403–419 (1959) the direction of motion of an associated metering bar can be sensed and used to switch the contact point that is movable from engagement with the fixed contacts shown to another set, not shown, that provides the decay of the note at the point in the motion of the metering bar when the movable contact initially used comes opposite the last steady state contact. Alternatively, the reverberation system could be relied upon to provide the decay for the notes of nonpercussive instruments, the movable contact being left in engagement with the fixed contacts upon the return stroke or lifted off when the movable contact comes opposite to the fixed contacts corresponding to the attack transient during the return stroke of the metering bar. For the notes of percussive instruments, it suffices that all fixed contacts correspond to segments of the decay transient; the movable contact is shifted quickly to the segment corresponding to the intensity of the note desired and then retired slowly to its rest position.

Output terminal fixed contacts 213, 214 and 215 are associated with each of first, second and third waveforms to be produced in succession on terminal 212 in response to actuation of key 211 causing movable contact 216 to sweep across contacts 213–215 in order for successive delivery of quantized signal waveforms to low pass filter 217 which smooths out the quantization by rejecting the higher frequencies corresponding to the quantization rate to produce the desired signal waveform on waveform output terminal 212.

A ring counter or shift register 221 is shown with three bistable stages 222–224, respectively. Each of stages 222–224 has an output terminal or line 225–227, respectively, for providing a waveform-producing signal level when the associated bistable stage is in the ONE condition. Ring counter 221 has a shift input 231 for receiving shift control signals or pulses from oscillator 232. A feedback line 233 couples an output of the last stage 224 to an input of the first stage 222 so that upon receipt of a shift pulse on line 231 with the last stage 224 in the ONE condition, the change of that stage from the ONE to the ZERO condition causes the first stage 222 to assume the ONE state. Typically only one of the three stages is in the ONE state at any one time. Each shift pulse applied to the shift input 231 from oscillator 232 causes the ONE state to shift to the following one of counters 222–224. Since ring counters and shift registers of this nature are well-known in the art, a detailed discussion thereof is not included herein.

Means, such as the T attenuators 234–236 couple terminals 225–227, respectively, to fixed output contact 213. Similarly, T attenuators 237–239 couple signal outputs 225–227, respectively, to fixed output contact 214 and T attenuators 241–243 couple signal output terminals 225–227, respectively to fixed output contact 215.

In general, there are as many bistable stages as there are samples desired to produce each cycle of a signal waveform. There are as many fixed output contacts as there are different signal waveforms desired to be reproduced associated with a particular note and timbre. And the number of T attenuator or other suitable coupling means is the product of the number of bistable stages with the number of fixed output contacts. Thus, with three bistable stages and three fixed output contacts as shown, there are shown nine T attenuators.

A modulation oscillator 229 and a summation junction 230 are provided for the purpose of modulating the rate at which the ring counter is triggered, thus providing a vibrato in the output signals. To this end, the output of the oscillator 232 and the output of the modulation oscillator 229 are summed together at the junction 230. The amplitude of the signal used to trigger the ring counter 221 may thus be modulated so that the instant at which the ONE state is advanced to the next counting element may be advanced or retarded, since each counting element always triggers at the same potential applied to it.

Having described the physical arrangement of the system of FIG. 8, its mode of operation will be discussed. Consider, for example, the simplified example of waveform synthesis with three samples. It is convenient, but not necessary, to assume that each of the bistable stages 222–224 provides a potential of E on lines 225–227, respectively, when a respective stage is in the ONE state and zero or ground potential at all other times. It is also convenient to initially assume that during the interval from zero to $t_1$ the first bistable stage 22 is in the ONE condition. The next shift pulse from oscillator 232 will then shift the ONE state to the second stage 223 at time $t_1$. The second stage will remain in the ONE condition until time $t_2$, when the next shift pulse from oscillator 232 will shift the ONE state to the third stage 224, which will remain in that condition until time $t_3$ when the ONE condition is again shifted to the first stage 222.

If attenuators 234 and 236 impart the same attenuation to produce a magnitude $K_1$ and attenuator 235 imparts infinite attenuation, then the first signal waveform produced on output contact 13 is the rectangular waveform as shown in FIG. 9A. If attenuator 239 imparts an attenuation to produce a magnitude of $K_2$ and attenuator 238 imparts an attenuation to produce a magnitude of ⅔ $K_2$ and attenuator 236 imparts an attenuation to produce a magnitude of ⅓ $K_2$, then the second signal waveform provided an output contact 214 is the signal waveform graphically represented in FIG. 9B approximately the sawtooth signal waveform shown in dotted lines. If attenuator 242 has an attenuation to produce a magnitude of $K_3$, attenuator 241 has an attenuation to produce a magnitude of ½ $K_3$ and attenuator 243 has infinite attenuation, then the third signal waveform provided on waveform output contact 215 is substantially that shown in FIG. 9C, roughly approximating the sine wave indicated in broken lines. It is to be understood that by increasing the number of samples and the rate at which the ONE state is shifted from one counter stage to the next, the deviation between the continuous waveform sought to be synthesized and the waveform quantized according to the invention may be made arbitrarily small. The waveforms of FIG. 9 have been selected as simple examples to illustrate the principles of the invention. It is to be understood that these principles may be applied to synthesize the more complex musical tone waveforms.

As key 211 is depressed, it first contacts fixed contact 213 as shown to first provide the first waveform of FIG. 9A on waveform output terminal 212 with quantization effects smoothed out by low pass filter 217. Then the moving arm 216 contacts fixed waveform output contact 214 to provide the second signal waveform of FIG. 9B on output terminal 212 smoothed by low pass filter 217. Finally output terminal 212 provides the third signal waveform of FIG. 9C smoothed by low pass filter 217 as moving contact 216 contacts the third fixed contact 215. These three signal waveforms could correspond to the attack transient, steady state and decay transient of a complex signal waveform.

Any type of attenuator may be used in place of the T attenuators shown. Indeed, each T attenuator may be replaced by an isolation and amplitude adjusting resistor and a load resistor of low value compared with the amplitude adjusting, isolation resistors at the input to the low pass filter.

The cutoff frequency of the low pass filter deserves some consideration. The number of samples generated during one cycle of the fundamental of the musical tone is preferably equal to at least twice the highest partial to be generated, and the cutoff frequency of the filter preferably exceeds that of the highest partial. Yet, the cutoff frequency is preferably also low enough to reject the higher frequency components corresponding to the step-like quantized character of the signal generated and to provide a smoothing and integration consistent with the highest frequency to be generated and the sampling rate. The sampling rate is preferably just high enough to permit satisfactory reproduction of the highest partial of interest.

Referring to FIG. 10, there is shown another embodiment of the invention in which the key 211 actuates a multiple pole switch so that the signal level provided by the ring counter produces the signal waveforms in FIG. 9 in sequence with the outputs of all the attenuators permanently coupled to the low pass filter 217. Where applicable, reference numerals designate corresponding elements throughout the remaining figures in the drawing. Output lines 225, 226 and 227 of bistable stages 222–224, respectively, are connected to moving contacts 251–253 of multiple throw switch sections 254–256, respectively. Each of the latter switch sections has three fixed contacts, each fixed contact being associated with a respective one of the three waveforms to be produced. Each of the nine fixed contacts illustrated is connected to a respective one of the nine attenuators 234–239, 241–243. The outputs of all nine of these attenuators are connected to the input of low pass filter 217 and that input terminates in load resistor 257. Output terminal 212 will provide the sequence of signal waveforms on output terminal 212 shown in FIG. 9 as key 211 is depressed to move the arms 251–253 in sequence across the three fixed contacts in each of sections 254–256. An advantage of this scheme is that one attenuator may be used with several notes to create a particular timbre.

Referring to FIG. 11, there is shown a block diagram illustrating the logical arrangement of an array of counters for providing a number of octavely related signal waveforms synchronized by a single oscillator 232. Cascaded binary counters 261–263 comprise a frequency divider driven by oscillator 232. The outputs of the first, second and third binary counter stages 261–263 energize respective shift inputs 264–266 of respective ring counters 267–269. Each of these ring counters may then function as a ring counter 221 in association with the system illustrated in FIGS. 8 and 10 in the manner described above to produce a number of octavely related complex signal waveforms.

Only 12 frequency standard oscillators are needed in a musical instrument incorporating this design, one for each note of an octave. If there are $n$ samples during the cycle of the fundamental of frequency $f$ of a note in the highest octave of the instrument, then the associated oscillator must have a frequency of $nf$ or one octavely related thereto. It is an advantage of this scheme that the master oscillators all generate high frequencies, thereby reducing the size of the components, and yet not so high that shielding is a problem. Further, only 12 oscillators need be tuned and kept in tune in an instrument so designed. Frequency modulation can be introduced for all notes of the instrument by modulating the frequencies of the top 12 oscillators, a matter that is facilitated by their moderately high frequencies. A simplification results from the fact that high notes do not require as many partials as low notes. The higher notes may, therefore, use fewer stages in their ring counters and may be triggered at a suitable suboctave lower in frequency than otherwise. One oscillator may then excite two or more ring counters associated with notes having a different fudamental upon occasion.

Referring to FIG. 12, there is shown a block diagram illustrating the logical arrangement of a ring counter controlled by an oscillator arranged to simultaneously provide a number of harmonically related complex signal waveforms. In the example shown, there are sixteen cascaded bistable stages C1–C16 comprising ring counter 271 and arranged to provide four samples of each of three octavely related signal waveforms. To better understand the operation of this aspect of the invention, it is convenient to divide the sixteen bistable stages into four groups designated I–IV. The four output terminals 272 each receive a waveform producing level from one and only one counter stage in each of the four groups to produce a signal waveform two octaves above the lowest octave. Each of the group 273 of output terminals receives a waveform producing level from respective counter stages in groups of two each. Thus the top one of these terminals receives a waveform producing level from the first two stages C1 and C2 in group I and from the ninth and tenth stages C9 and C10, respectively, in group III. Finally, for each of the terminals in the group 274 the stages in each group are all connected together to form quadruplets that apply waveform producing levels to the respective terminals to produce the complex signal waveform of highest frequency. The groups of terminals 272, 273 and 274 may be connected to respective attenuators in a manner described above to produce first, second and third octavely related complex signal waveforms. In a typical musical instrument there might be 12 individual chains, one for each note in an octave.

Referring to FIG. 13, there is shown an embodiment of a system according to the invention employing potential dividers and isolation resistors to control the amplitude of a segment of a complex signal waveform at an associated instant of time, there being one and only one isolation resistor and bistable stage associated with each of the possible instants of time for a single signal waveform. The ring counter 281 is driven by oscillator 232 and comprises six cascaded bistable stages 282–287. Each of potential dividers 291–296 is connected from the output of a respective one of bistable stages 282–287 to ground and is shown with four taps to make available five potential levels when the associated bistable stage is in the ONE condition. First, second, third and fourth complex signal waveforms are provided for fixed contacts 301–304, respectively. A key 305 is mechanically linked to moving contact 306 and moving contact 307. Moving contact 306 selectively and successively couples one of fixed contacts 301–303 to the formant filter 308 which is in turn coupled by a modulator 309 to an intensity control 310, the formant filter preceding modulator 309 being typically associated with a single class of musical tones, such as trumpet tone, for reproduction electronically. The modulator applies an appropriate and characteristic modulation in amplitude, frequency, or waveform to the signals applied to it.

Similarly, moving contact 307 selectively couples the signal on fixed contact 304 (and as many other fixed contacts as may be desirable) to the formant filter 311. The modulator 312 then couples the output of the formant filter 311 to the intensity control 313, these three system components being associated with a different class of musical tones, such as those produced by an oboe. The outputs of the intensity controls like 310 and 313, may then be combined on a common signal line 314 for application to an amplifier output swell pedal, environmental modifier and loudspeakers associated with an electronic musical instrument. The intensity controls 310 and 313 regulate the relative intensities of the different timbres. Other keys such as 315 may be used to actuate other moving contacts like 316 and 317 which in turn select complex waveforms from other sets of fixed contacts like 318 and 320 associated with another set of isolation resistors and similar apparatus shown in FIG. 13. Since illustration and description of the single ring counter 281 and associated circuitry adequately illustrates the principles of the invention, the other similar apparatus is not shown so as to avoid obscuring the principles of the invention.

There are as many isolation resistors associated with each of the fixed contacts as there are bistable stages. Thus, isolation resistors 322–327 are associated with fixed contact 301. Similarly, there is a set of six isolation resistors associated with each of fixed contacts 302, 303 and 304. The modulators and the formant filters may be permuted. If the modulations applied to the timbre of one instrument are like those applied to another, then the outputs of the lines from each formant filter and relative intensity control may be combined together and applied to a common modulator the output of which excites line 314. The individual modulators, such as 309 and 312, associated with each timbre may then be omitted.

A method of controlling the intensity of each note by the key is also shown in FIG. 13. The variable resistor 367, for example, is associated with and linked to the key 305 so that variable depression of the latter will alter the resistance of the variable resistor 367. Since this resistor 367 is in series with the movable contact 306 and the output circuit comprised of the formant filter 308 and the modulator 309, the key may be used to control the intensity of the note by alteration of the depression. A similar resistor 369 is connected between the movable contact 307 and the output circuit comprised of the formant filter 311 and the modulator 312. This resistor 369 is also linked to the key 305 so that variable depression of the key 305 adjusts the resistance of resistance 369. Similar resistors are linked to this key 305 for each of the timbres associated with this key. Thus, by alteration of the depression of key 305 the intensity of all timbres associated with this key may be adjusted at any time by the player. Other variable resistors are associated with other keys. For example, variable resistors 368 and 370 are linked to key 315 and adjusted by the variable depression of this key 315. These resistors 368 and 370 are connected in series with the movable fingers 316 and 317, respectively, and with the output circuits comprised of the formant filters 308 and 311, and the modulators 309 and 312, respectively. Thus, adjustment of the depression of the key 315 controls the intensity of all timbres associated with this note at all times.

In the scheme using variable resistors to achieve various intensities during the steady state, the waveform may not be changed with intensity. Another, simple scheme with much to recommend it consists of merely a number of fixed contacts appended and placed side-by-side with the contacts already shown, such as 301, 302 and 303, to which steady state signals are applied, through isolation resistors 322, of suitable waveform and of graded intensity. The waveform may then be dependent upon intensity or not as befits the case. Another advantage of this method is that the contacts and isolation resistors associated with the steady waveforms, together with their connections to the potential buses, may be made simultaneously with the contacts and isolation resistors for the other segments of the tone and thus at very little additional cost.

Waveform modulation during the steady state or any other part of the tone of a musical instrument may be achieved by any of several methods. The formant filters 308 or 311 of FIG. 13 may be modulated in time to alter the ratios of the amplitudes of the partials relative to each other. This scheme is simple and quite practical. Another more flexible scheme consists in the use of nonlinear resistors for the isolation resistors, as, for example, resistors

100, 101, 102, and 103 in FIG. 2. A biasing signal generated by a suitable source, such as a low frequency oscillator, may then be applied to these nonlinear resistors for the purpose of cyclically changing their values and thus the waveform synthesized. In view of the great difference in the frequencies of the modulating and modulated signals, there is no particular difficulty in choosing blocking and bypass condensers to prevent cross talk and coupling between the various sources of audio and subaudio signals, should that be desirable.

Still another technique of introducing low frequency modulation, typically modulation at one or more subaudio frequencies, resides in applying a modulation signal from a modulation oscillator 371 through respective isolation impedances 372–377 to attenuators 291–296, respectively, which attenuators may have nonlinear attenuation characteristics dependent upon the instantaneous amplitude of the signal provided by modulation oscillator 371.

Another interpretation of FIG. 8 or 13 is possible. In a broad sense, the counter chain may be considered to be any set of suitable signal generators, such as square waves, sine waves, triangular waves, or pulses, synchronized together either by each other or by a separate source of energy. If sine wave, square wave, or triangular wave oscillators are used, as is sometimes advisable, then the outputs of the various oscillators would be harmonically related to and could be synchronized by one of the oscillators. Normally it is most convenient to choose the oscillator creating the fundamental for this purpose. Sine waves and square waves are particularly simple to generate with familiar and standard methods, and sometimes lead to a simpler representation, i.e., one involving fewer terms for a given accuracy, than one in which rectangular pulses are used. The resistor coupling network comprised of the potential dividers, potential buses, isolation resistors, and the connections involved may be regarded as creating a superposition (linear superposition if fixed resistors are used) of the basis functions created by the synchronized oscillator chain. In other words, the basis conveniently generated is linearly transformed to the waveform desired by the array of fixed resistors.

Referring to FIG. 14, there is shown an alternate form of cascaded bistable stages, an oscillator-synchronized counter chain, which may be used instead of the ring counters shown in the different embodiments. In the first alternate form shown in FIG. 14A oscillator 232 triggers the first stage 330 of a number of cascaded univibrators or monostable multivibrators. When each univibrator is in its astable state, it provides the waveform producing signal level on its associated output line energizing the potential dividers. When a stage shifts from its astable state back to its normal rest state, it triggers the following univibrator to shift that following univibrator to the astable state. Preferably, the sum of the astable periods of the cascaded univibrators is about the same as the period of the signal provided by oscillator 232. Thus, each cycle of the signal from oscillator 232 produces a train of waveform producing levels from the following univibrators.

In the second alternate form shown in FIG. 14B oscillator 232 also triggers the first stage 330 of a number of cascaded univibrators. When each univibrator stage shifts from its astable state back to its normal rest state, it triggers the following univibrator stage to shift that following univibrator stage to the astable state. But the last of these univibrator stages sets flip-flop 331, the last of the chain of bistable stages. The same signal from oscillator 232 which triggers the first univibrator stage 330, also resets flip-flop 331. Thus, the set of waveform producing levels provided by the univibrators and flip-flop 331 occurs during a period that corresponds to the period of the signal provided by oscillator 232.

It will be noticed that this embodiment produces an orthogonal basis of contiguous, rectangular pulses, but that they have no fixed normalization in general, since the pulse widths may all be different from each other. One univibrator may create a short, narrow pulse while another one creates a long one. Such a representation is particularly suited to certain instruments, such as the brilliant brasses (trumpets and trombones, for example), and can lead to an accurate representation with but few elements. Further, it turns out that formant filters may be used with particular success with this type of representation. The oscillator serves to maintain the frequency accurate, so that almost all components may be made with relatively large tolerances.

Referring to FIG. 15, there is shown still anotther arrangement for producing a succession of waveform producing levels. This arrangement is especially advantageous because it reduces the number of counters required to produce the desired signals. Oscillator 232 drives a binary counter comprsing flip-flops, such as 333–337. The outputs of the elements of the counter chain drive AND gates that act to decode binary numbers in essence. Each element in the binary chain counter corresponds to a bit position; elements further down the chain may be thought of as corresponding to successively more significant bit positions in the particular illustration shown. Essentially, the potentials applied to the AND gates associated with a particular note by the elements of the counter chain are subdivided into binary groups of various orders with raised or lowered potentials applied to the terminals of the AND gates corresponding to each other so that one and only one gate has all terminals simultaneously raised in potential. This AND gate and only this one will produce an output as a consequence. Each counting element in each stage of the ring counters shown in the preceding figures is then replaced by an AND gate.

In a ring counter let $n$ be the number of samples produced. This system is useful if the number of samples $n$ created during a cycle of the waveform is an integral power of 2; that is, $n=2^m$, where $m$ is an integer. In such a case $m$ binary counters are used in the chains, and there are $m$ inputs to each AND gate. Each binary counter will in general excite $m$ AND circuits associated with $m$ different notes.

In the example illustrated, each flip-flop has an A and B output which provides conditioning levels during alternating mutually exclusive time intervals. Each of the gates has two input legs connected to respective flip-flop outputs. Thus, the set of four gates associated with each note is arranged so that the pair of input legs on each gate of a set are connected to an output of one of the cascaded flip-flops and an output of an immediately preceding flip-flop so that one and only one of the gates of a set has both legs simutaneously conditioned at any one time to produce an output signal at any one time for delivery to an associated potential divider. The result of this arrangement is that the set 341 of four gates provides the pulses used to produce the lowest note provided by the three sets of gates shown, the set 342 of four gates provides the signal waveform an octave above that lowest note, and the set 343 of four gates provides the waveform producing levels used to produce a note two octaves above the lowest note provided by the gates 341.

A feature of the invention is that a number of types of modulation may be introduced into the circuits employing the bistable stages with ease to introduce desired musical effects. For example, frequency modulation of the oscillator 232 will cause frequency modulation and a vibrato in the output circuit. By adding a small signal to the output of an oscillator 232, the effective frequency of the wave created can be made to vary. Subaudio frequency modulation leads to a vibrato; audio frequency modulation leads to a small uncertainty in the timing of the wave or a trembling motion. Noise in the right amount will create a random modulation in frequency. Of course, noise may be added to the output circuits also to enhance the lifelike character of the timbres created. As still another alternative, the oscillators 32 may be replaced by the out-with respect to the key channel by the metering bar pawl 421 so that the spring 425 is prevented from returning the metering bar 423 to a position in which its lip 409 rests against the key channel 407.

Motion of the metering bar 423 causes the rocker arm 417 surrounded by the rocker arm guide web 426 to rotate clockwise. The rocker arm 417 is attached to a connecting bar 427. A contact finger plate 431 is made of electrically insulating material, is rotatably mounted on the connecting bar 427 about pivot point 432, and carries, on a suitable lip 433, a left-hand movable contact spring finger 434 and a right-hand movable spring contact finger 435, which are separated from each other. The other side of the contact finger plate 431 is engaged by a spring 436, preferably U-shaped, that is affixed to a mounting bracket 438 on a solid frame. The other end of the connecting bar is guided by a slot in a guide web 437.

Clockwise motion of the rocker arm 417 causes the connecting bar 427 to move left. The contact plate spring 436 causes the contact plate 431 to rotate slightly counterclockwise and the right-hand movable contact spring 435 to touch a sequence of attack-transient, fixed contacts 441 and steady-state, fixed contacts 442 supported on fixed contact plate 440. The contact assembly may be similar to that shown in FIGS. 3 and 4 and may be similarly connected. As connecting bar 427 moves to the left, it deflects connecting bar flat spring 443, whose end resides in slot 444, clockwise about the connecting-bar flat spring mounting bracket 445.

Further depression of the key 401 against the preloaded springs 402 causes the metering bar pawl 421, which is carried by the keyed channel 407, to move the rocker arm 417 further clockwise, which in turn moves the connecting bar 427 and contact plate 431 further to the left, causing right-hand movable spring contact finger 435 to touch additional ones of the steady-state, fixed contacts 442. The fixed contacts 441 correspond to successive waveforms in the attack transient of the non-percussive tone while the fixed contacts 442 correspond to successive steady-state waveforms corresponding to various intensities, as explained above. Thus, by further depression of the key 401 the intensity of the associated note may be increased, and conversely. The lip 439 on the rotatable contact plate 431 and the direction-sensing spring 436 are so designed that they engage each other only when the right-hand movable spring contact finger 435 is opposite a fixed contact corresponding to a waveform belonging to the attack transient. The weight of the lip 439, noncentering of the mounting axle 432, a suitable spring not shown, or a friction element (as, for example, a belleville spring squeezed between the rotatable contact plate 431 and the connecting bar 427) may be used to hold the right-hand movable spring contact finger 435 against the corresponding fixed contacts 441 and 442. It is noted that the key 401 may be released somewhat without releasing the pawl 421 from engagement with the metering bar 423. Thus, the intensity of a note may be decreased by partial release of the key, the movable contact fingers 434 and 435, the rotatable contact plate 431, the connecting bar 427, the rocker arm 417, the metering bar 423, and the pawl 521 all reversing their direction of motion established initially.

If the key is released sufficiently that the movable contact finger 435 comes opposite the (first) steady-state fixed contact of the set 442 adjacent to the (last) attack-transient fixed contact of the set 441, the lip 439 of the rotatable contact plate 431 is engaged by the direction-sensing spring 436. This spring 436 causes the rotatable contact plate 431 to rotate clockwise slightly so that the left-hand movable spring contact finger 434 engages a sequence of fixed contacts 446 for the decay transient. At this point, further release of the key 401 causes the percussive-nonpercussive eccentric 418 to release the metering bar 423, which then permits the rocker arm 417, connecting bar 427, and contact plate 431 to be returned to their rest positions in response to connecting bar flat spring 443 being restored to its rest position. The dimensions are so arranged that the left-hand movable spring contact finger 434 engages decay transient fixed contacts 446 before the right-hand movables spring contact finger 435 disengages the steady-state fixed contacts 442. Resistive material is preferably sprayed on the insulating contact plate 431 just underneath the two contact spring fingers 434 and 435, and the output is taken from the center of this resistant layer. Thus, there is no interruption in the tone in switching from the right-hand set of fixed contacts, which provide attack transient and steady-state wave-form portions, to the left-hand fixed contacts, which provide decay transient waveform portions. The resistive layer and connections used form the average of the two signals during the transient portions when both contact spring fingers 434 and 435 are touching their respective fixed contacts. Upon completion of this transition the rocker arm 417 comes against a felt covered rest 447, the lip 409 of the metering bar 423 comes to rest against a piece of felt 451 attached to the key channel 407, and the key channel comes to rest against a felt step 452 depending from the upper fallboard (not shown).

Turning now to a discussion of the mode of operation for percussive tones, the percussive-nonpercussive eccentric 418 is rotated 90° clockwise so that the metering bar pawl 421 can never engage the metering bar 423, even when the key 401 is depressed. The sostenuto eccentric 414 is rotated to the position shown in FIG. 19. The yoke 454 that carries the rubber covered idler 415 is itself carried by a flat spring 455 attached to th key channel 407. With the sostenuto eccentric 414 in the position shown the yoke 45 falls sufficiently upon depression of the key 401 that the rubber-covered idler wheel 415 comes into contact with both the timing cylinder 456 (driven at constant angular velocity by means including a synchronous motor or other suitable means not shown) and the round part 416 of the rocker arm 417. Depression of the key 401 throws the metering bar 423 downward against the restraining metering bar flat spring 425, and causes the rocker arm 417 to rotate by an amount proportional to the speed of depression of the key 401. In view of the slots 457 in the loke 454, the rubber-covered idler 415 rides freely on the timing cylinder 456 and the round portion 416 of the rocker arm 417. The clockwise motion of the arm 417 is, therefore, not impeded by the idler 415.

The contact plate 431 and its movable contact fingers 434 and 435 operate for percussive tones exactly as for nonpercussive tones, except that the right-hand movable contact finger 435 and its associated set of attack transient fixed contacts 441 and steady-state fixed contacts 442, and the averaging resistance are now superfluous. Attack transients are not needed, and steady states simply do not exist for percussive tones. The quick motion of the contact plate to the left is soon followed by a slow motion to the right. The metering bar 423 returns to its rest position against the key channel 407 promptly. As soon as the rocker arm 417 starts to retire to its rest position, the rubber-covered idler wheel 415 automatically engages the timing cylinder 456 and the round part 416 of the rocker arm. The slowly rotating timing cylinder 546 returns the rocker arm 417 and thrusts the movable contact fingers 434 and 435 back toward their rest positions at a constant rate. However, this timing motion stops as soon as the key 401 is released, for then the yoke carrying flat spring 455 attached to the key channel 407 lifts the yoke so that the rubber covered idler wheel 415 no longer contacts the timing cylinder 456 and the portion 416 of rocker arm 417. The rocker arm 417, movable contact fingers 434 and 435, and associated equipment then return promptly to their rest positions. The next cycle may then begin.

If the sostenuto eccentric 414 is rotated 90° clockwise from the position shown, however, the key channel 407 puts of choral modulators as described in Clark, Proposed Keyboard Musical Instrument in J. Acoust. Soc. Am., vol. 31, 403–419, particularly 410–411, (April 1959). The oscillators 232 may themselves be part of the choral tone generating apparatus. These oscillators may be modulated in either or both of amplitude and frequency by multiple, asynchronous sub-audio waves differing in frequency or through other suitable techniques, such as noise sources.

Referring to FIGS. 16 and 17, there is illustrated a system for perturbing the frequency of oscillator 232 which in turn controls the advance of the waveform-producing signal level through the chain of cascaded bistable stages. A ring counter 351 is shown driven by oscillator 232 whose frequency depends upon the resistance between the frequency controlling line 352 and ground. A variable resistance 353 having an arm controlled by sideways movement of key 354 is shown for controlling the frequency perturbation of a single note. This variable resistance 353 is in series with a variable resistance 355 which controls the sensitivity of the different frequency perturbing resistors associated with the different keys. Chiefly only small perturbations of the frequency by the keys are contemplated to facilitate the easy playing of the instrument. Thus, the impedances in the frequency determining networks need be and are changed only a small amount, in keeping with the small sideways displacement of the keys that is possible.

Referring to FIG. 17, there is shown an alternate arrangement in which a frequency perturbing capacitor 355 actuated by sideways movement of key 354 perturbs the oscillator frequency, and variable capacitor 356 controls the sensitivity of the different frequency producing capacitors.

Referring to FIG. 18, there is shown a block diagram illustrating the logical arrangement of an especially advantageous embodiment according to the invention in which the cascaded bistable stages themselves perform the additional function of coacting with other system elements to control the frequency in a manner which permits easy key-controlled frequency perturbation and eliminates the need for a separate oscillator to stabilize the frequency of the chain. A ring counter 361 comprises a number of cascaded stages. The time in which each of the univibrators remains in the astable stage depends upon the potential on bias line 362. Since the period for a complete cycle of operation of the ring counter 361 is essentially the sum of the times the different univibrators remain in the astable state, the potential on bias line 362 controls the frequency of ring counter 361. A low-pass filter 363 accepts signals from one of the univibrator stages 364 to provide a bias control potential which is delivered by summing resistor 365 to bias line 362 to help maintain the frequency of ring counter 361 essentially constant in the absence of potential changes delivered by summing resistor 366. Summing resistor 366 will deliver potential changes in response to changes in the variable frequency perturbing resistance 353, the range of perturbation provided by this resistor being controlled by the sensitivity control 355.

Low-pass filter 363 preferably passes only those frequencies well below those wtih which the frequency of each note would be modulated by sideways movement of an associated key like 354. Thus, the low-pass filter 363 averages over the output of the univibrator 364 to which it is connected with a period long compared with the key-produced vibrators if the cutoff frequency is about 0.6 c.p.s. or lower. Such a low cutoff frequency prevents the automatic frequency controlling circuit from tracking the adjustment effected by the key and permits the frequency of the chain to be regulated by the coacting key. Nevertheless, the average frequency of the ring counter 361 is stabilized against temperature changes, variations in the values of the parameters of the active and passive elements of the counter and similar parameter variations which occur even much more slowly. From the mode of operation of the automatic frequency controlling circuit, it will be noted that only those parameters that determine the width and height of the pulse of the last univibrator need to be accurately determined and, therefore, the tolerances on all other components in the ring counter can be quite large.

The elements in the ring counters may be of many types: ferrite cores, gas diodes, gas thyratrons, bistable multivibrators. Electrical delay lines with taps at a number of points along their length can be used to replace the ring counters. Each delay line would be excited by a repetitive pulse at its input. Since the taps need not be equally spaced, a representation consisting of orthogonal pulses of different widths may be generated with the advantages pointed out in connection with the apparatus of FIG. 14. In the present case, however, the pulses may not be contiguous. A better low pass filter is then needed to remove the greater quantization noise that results as a consequence.

Referring to FIG. 19, there is shown a means of controlling the intensity of each note by adjustment of the speed and force of depression of the associated key. This keying system will work for both percussive and nonpercussive tones. The side view of the structure is shown to best and fully illustrate this aspect of the invention without obscuring the principles of the invention, certain structural portions being shown in section where appropriate. The structural arrangement will be best understood by identifying the different elements as the various functions are described.

Turning first to a consideration of the operation for non-percussive tones having attack transient, steady-state and decay-transient portions of interest, the white key 401 is restrained against depression by a set of flat springs 402 that are preloaded by appropriate precompression bars 403 on the inside of the fallboard 404, the springs 402 being supported in the preloaded flat spring mounting brackets 405.

A number of bottoming positions are defined by this set of preloaded flat springs 402. Further, the springs 402 provide a certain amount of coulomb friction that prevents the finger from oscillating the key. Each key (like the white one 401 and the black one 406) is mounted on a key channel 407 that is supported at its further end by means of a flat spring 408 working over a fulcrum 411 with its end held in fixed relationship to a mounting bracket 412 determined by the key channel adjusting screw 413. The initial force required to depress the key to the first of the preloaded springs is adjusted by screw 413.

For nonpercussion tones the sostenuto eccentric 414 is rotated 90° counterclockwise from the position shown in FIG. 19 so that the rubber covered idler wheel 415 can never engage the round surface 416 of rocker arm 417 even when the key 401 is depressed. The percussive-nonpercussive eccentric 418 is shown in the proper position for nonpercussive tones.

A metering bar pawl 421 is carried by the key channel pivotally mounted for movement about the axis of the pin 422. The pawl 421 is urged toward the metering bar 423 by a flat spring 424, but is prevented from touching the metering bar 423 by the percussive-nonpercussive eccentric 418 when the key 401 is in its rest position. Depression of the key 401 will cause the pawl 421 to engage the metering bar 423 when the key 401 is depressed if the percussive-nonpercussive eccentric 418 is in the position shown. Upon depression of the key 401 against the preloaded flat springs 402 and against the flat spring 408 that carries the key, the metering bar 423 is thrown downward away from engagement with the key channel 407 against a restraining flat spring 425 by a distance that is directly proportional to the speed of depression of the key. This metering bar 423 is caught in its extreme position is prevented from moving the yoke 454 by spring 455 and thus disengaging the rubber covered idler 415 from the timing cylinder 456 and the portion 416 of rocker arm 417. Thus the slow, timed motion back towards the rest position continues, until the next depression of the key. This means of engagement between the rocker arm 417 and the timing cylinder 415 is essentially without backlash, for the relevant parts are always in contact with each other. Furthermore, the design results in freedom from pumping with sustained percussive notes; that is, successive repetition of a note with sostenuto does not lead to gradually increasing intensity.

The key 401 is prevented from rotating by the guide web 461 and the projection 462 from the key channel 407 that actuates the preloaded springs 402. Likewise, a suitable web 426 guides the rotational motion of the rocker arm. Felt, or other suitable sound absorber, is provided on all contact surfaces where necessary to prevent noise. Flat plates, such as mounting plate 463, spaced at regular intervals, support the numerous long members, bars, shafts, axles, eccentrics and brackets, to all keys and hold them in a fixed position. Axle holding plates permit the associated axles to be assembled and held in place. Since such mounting and holding plates are well-known, details are not shown in FIG. 19 to avoid obscuring the principles of the invention.

Mounting the fixed contacts 441, 442 and 446 on the underside of the fixed contact plate 440 greatly reduces the dust accumulating on the contacts.

There has been described a novel system for synthesizing complex signal waveforms which is especially useful in connection with electronically producing realistic musical tones of a large variety under the control of a single performer. It is evident that numerous modifications of and departures from the specific embodiments described herein may be practiced by those skilled in the art without departing from the inventive concepts. Consequently, the invention is to be construed as limited solely by the spirit and scope of the appended claims.

What is claimed is:

1. Signal waveform generation apparatus comprising,
a source of a plurality of cyclical basis signals,
an output terminal,
means for selectively superposing said plurality of cyclical basis signals according to a first pattern and selectively coupling the basis signals superposed according to said first pattern to said output terminal during a first time interval,
and means for selectively superposing said plurality of cylical basis signals according to a second pattern different from said first pattern and interrupting the selective coupling to said output terminal of the basis signals superposed according to said first pattern and selectively coupling the basis signals superposed according to said second pattern to said output terminal the sum of said first and second time intervals being no greater than the duration of a musical tone during a second time interval contiguous with said first time interval.

2. Signal waveform generation apparatus in accordance with claim 1 and further comprising keying means operative for selecting said patterns to effect the coupling of combinations of said cyclical basis signals to said output terminal of a signal waveform corresponding to that of a musical tone.

3. Signal waveform generation apparatus in accordance with claim 1 wherein said source of cyclical basis signals comprises a source of sinusoidal signals of different audio frequencies.

4. Signal waveform generation apparatus in accordance with claim 1 wherein said source of cyclical basis signals comprises a source of sawtooth signals of different audio frequencies.

5. Signal waveform generation apparatus in accordance with claim 1 wherein said means for selectively superposing comprises.
means including attenuating means coupling each of said cyclical basis signals to said output terminal to control the amplitude of each basis signal delivered to said output terminal.

6. Signal waveform generation apparatus in accordance with claim 5 and further comprising,
a source of a low frequency modulating signal,
and nonlinear means coupled to the latter source introducing a transfer characteristic between said cyclical basis signals source and said output terminal that is related to the instantaneous value of said low frequency modulating signal.

7. Signal waveform generation apparatus in accordance with claim 1 wherein said means for selectively superposing and selectively coupling the basis signals superposed according to said first pattern to said output terminal comprises a first set of resistive attenuators coupling each of said cyclical basis signals to said output terminal to control the amplitude of each basis signal delivered to said output terminal according to said first pattern,
and said means for selectively superposing and selectively coupling the basis signals superposed according to said second pattern to said output terminal comprises a second set of resistive attenuators coupling each of said cyclical basis signals to said output terminal to control the amplitude of each basis signal delivered to said output terminal according to said second pattern.

8. Signal waveform generation apparatus in accordance with claim 7 and further comprising,
a first intermediate terminal coupled to said source of basis signals through said first set of resistive attenuators,
a second intermediate terminal coupled to said source of basis signals through said second set of resistive attenuators,
and keying means for coupling said output terminal successively to said first and second intermediate terminals.

9. Signal waveform generation apparatus in accordance with claim 8 and further comprising,
means for coupling said output terminal to both said first and second intermediate terminals during the interval in which said keying means changes that one of said intermediate terminals to which said output terminal is coupled to the other of said intermediate terminals.

10. Signal waveform generation apparatus in accordance with claim 9 and further comprising,
an insulating card for supporting said first and second sets of attenuators and said intermediate terminals,
first and second contacts relatively movable with respect to said intermediate terminals and supported by a rockable arm pivotable about a translatable axis so that translation of the latter axis in first and second opposed directions causes clockwise and counterclockwise displacement respectively of said first and second contacts about the latter axis to keep said first and second contacts respectively then urged against said insulating card,
means including resistive means coupling said first and second contacts to said output terminal,
a depressible key comprising said keying means,
and means for coupling said depressible key to said translatable axis to move the latter axis in said first direction to contact said first intermediate terminal and to move the latter axis in said second direction upon release of said key to momentarily establish contact simultaneously between said first contact and said first intermediate terminal and between said second contact and said second intermediate terminal and thereafter interrupting the contact between said first contact and said first intermediate terminal while allowing said second contact and said second intermediate terminal to remain in contact.

11. Signal waveform generation apparatus in accordance with claim 10 and further comprising, means for selectively establishing substantially uniform velocity of said translatable axis along said second direction upon release of said depressible key.

12. Signal waveform generation apparatus in accordance with claim 1 wherein said means for selectively superposing comprise, a plurality of potential dividing resistors each having a plurality of taps and energized by a respective one of said basis signals, a sequence of intermediate terminals, respective isolation resistors coupling each intermediate terminal to a selected tap on a respective potential dividing resistor, a plurality of output terminals each associated with a different group of said intermediate terminals, and means for coupling each of said output terminals in sequence to each of the intermediate terminals in the associated group to simultaneously provide respective musical tone signal waveforms on said output terminal of the same fundamental pitch but of different musical character.

13. Signal waveform generation apparatus in accordance with calim 12 wherein the resistance of said potential dividing resistors is a function of an applied modulating signal, a source of subaudio modulating signal, and a plurality of isolation impedances each coupling a respective one of said potential dividing resistors to said source of subaudio modulating signal.

14. Signal waveform generation apparatus in accordance with claim 12 and further comprising, an output line, and a plurality of formant filters each coupling a respective one of said output terminals to said output line.

15. Signal waveform generation apparatus in accordance with claim 14 and further comprising, a plurality of insulating cards each supporting at least one potential dividing resistor and at least one group of said intermediate terminals, for each group of intermediate terminals first and second contacts relatively movable with respect to said one group of said intermediate terminals and supported by a rockable arm pivotable about a translatable axis so that translation of the latter axis in first and second opposed directions causes clockwise and counterclockwise displacement respectively of said first and second contacts about the latter axis to keep said first and second contacts respectively then urged against said insulating card, means including resistive means coupling said first and second contacts to the associated one of said output terminals, a depressible key comprising keying means, and means for coupling said depressible key to said translatable axis to move the latter axis in said first direction upon depression of said key causing said first contact to contact the first intermediate terminal in said one group and to move the latter axis in said second direction upon release of said key to momentarily establish contact simultaneously between said first contact and said first intermediate terminal and between said second contact and the second intermediate terminal in said one group and thereafter interrupting the contact between said first contact and said first intermediate terminal while allowing said second contact and said second intermediate terminal to remain in contact.

16. Signal waveform generation apparatus in accordance with claim 15 and further comprising, means for selectively establishing substantially uniform velocity of said translatable axis along said second direction upon release of said depressible key.

17. Signal waveform generation apparatus in accordance with claim 16 wherein the resistance of said potential dividing resistors is a function of an applied modulating signal, a source of a subaudio modulating signal, and a plurality of isolation impedances each coupling a respective one of said potential dividing resistors to said source of subaudio modulating signal.

18. Signal waveform generation apparatus in accordance with claim 12 and further comprising, an output line, and means for modulating the signal on each output terminal at a subaudio rate and delivering the modulated signals to said output line.

19. Signal waveform generation apparatus in accordance with claim 18 and further comprising, a plurality of formant filters each coupling a respective one of said output terminals to said output line.

20. Signal waveform generation apparatus in accordance with claim 1 wherein said source of cyclical basis signals comprises a source of rectangular basis signals.

21. Signal waveform generation apparatus in accordance with claim 20 wherein said source of cyclical basis signals comprises a source of square wave basis signals.

22. Signal generation apparatus in accordance with claim 20 and further comprising, a plurality of devices capable of assuming one of first and second states, means for cascading said devices to form a counter for repetitively changing the count therein at a controllable rate, an impedance element for controlling said rate, and keying means coupled to said impedance element for changing the impedance thereof to effect perturbations in said rate.

23. Signal generation apparatus in accordance with claim 22 and further comprising, a source of clock pulses occurring at a rate controlled by said impedance element, and means for coupling said clock pulses to said counter to establish said controllable rate.

24. Signal generation apparatus in accordance with claim 22 wherein each of said devices comprises a univibrator having stable and astable states and further comprising, means for cascading said univibrators to form a ring counter chain in which each univibrator changes from the stable state to the astable state in response to the immediately preceding univibrator changing from the astable state to the stable state, a bias line coupled to at least one of said devices for receiving a bias signal that controls the duration of the latter device remaining in its astable state, means including said impedance element for providing a portion of said bias signal to said bias line, and a low pass filter coupling the output of one of said devices to said bias line to provide a portion of said bias signal to said bias line.

25. Signal waveform generation apparatus in accordance with claim 20 and further comprising, a source of clock pulses, a plurality of devices capable of assuming one of first and second states, means responsive to said clock pulses for effecting changes of state of said devices with a periodicity established by said clock pulses, and means for selectively coupling said devices to said output terminal.

26. Signal waveform generation apparatus in accordance with claim 25 and further comprising, means for intercoupling said devices to form a shift register in which said first state is shifted from one device to a following one in response to each of said clock pulses.

27. Signal generation apparatus in accordance with claim 25 and further comprising,
means for cascading a first plurality of said devices to form a counter chain,
means for coupling said clock pulses to the first device in said counter chain to provide at least one set of subharmonic clock pulses occurring at a rate that is a submultiple of the rate of said clock pulses,
means for cascading a second plurality of said devices,
means responsive at least to said clock pulses for effecting changes of state of said devices composing said second plurality with a periodicity established by said first-mentioned clock pulses,
means for cascading a third plurality of said devices,
and means responsive to at least said one set of subharmonic clock pulses for effecting changes of state of said devices composing said third plurality with a periodicity established by said subharmonic clock pulses that is different from the periodicity of the changes of state occurring among said second plurality.

28. Signal generation apparatus in accordance with claim 25 and further comprising,
means for cascading said devices to form a ring counter chain,
means responsive to said clock pulses for indexing said ring counter,
at least first and second groups of bilevel terminals each providing a first level when any of said devices coupled thereto assumes the first stable state and providing a second level at all other times,
means for coupling each bilevel terminal in said first group to consecutive ones of said devices in contiguous groups thereof,
and means for coupling each bilevel terminal in said second group to respective ordered ones of said devices separated from the preceding ordered one of said devices by a predetermined number of said devices.

29. Signal generation apparatus in accordance with claim 25 wherein said states are both stable and further comprising,
means for cascading said devices to form a counter chain,
means responsive to said clock pulses for indexing said counter chain,
at least first and second groups of bilevel terminals, and gating means for each bilevel terminal coupling a respective bilevel terminal to a different pair of said devices so that said first group of bilevel terminals provides a recurring waveform that occurs at a rate octavely related to the recurring waveform that said second group of bilevel terminals provides.

30. Signal waveform generation apparatus in accordance with claim 25 wherein each of said devices is a monostable device having a stable and astable state,
means for cascading said monostable devices so that a change from astable to stable state of a device causes the following device to change from the stable to the astable state,
and means for coupling said clock pulse source to the first of said cascaded devices so that said first of said cascaded devices changes from the stable to the astable state in response to a clock pulse.

31. Signal waveform generation apparatus in accordance with claim 30 and further comprising,
a bistable device having set and reset states responsive to the last of said monostable devices changing from the astable to the stable state for assuming the set state.
and means for coupling said clock pulse source to said bistable device to return the latter to the reset state in response to a clock pulse.

32. Signal generation apparatus comprising, a plurality of two-state devices having stable and astable states,
means for cascading said devices to form a ring counter chain in which each device changes from the stable state to the astable state in response to the immediately preceding device changing from the astable to the stable state,
a bias line coupled to at least one of said devices for receiving a bias signal that controls the duration of the latter device remaining in its astable state,
and means including a low pass filter coupling the output of one of said devices to said bias line to provide a bias signal thereon for controling said duration so as to oppose changes in the duration of a complete cycle of state changes of said ring counter.

33. Signal waveform generation apparatus comprising, a plurality of intermediate terminals,
means for providing said intermediate terminals with respective signal waveforms corresponding to respective contiguous segments of a musical tone,
an output terminal,
and means for successively coupling during contiguous time intervals each of said intermediate terminals to said output terminal to provide a signal waveform on said output terminal corresponding to said musical tone.

34. Signal waveform generation apparatus in accordance with claim 33 and further comprising,
keying means for actuating and linked to said means for successively coupling each of said intermediate terminals to said output terminal.

35. Signal waveform generation apparatus in accordance with claim 33 wherein at least one of said intermediate terminals is provided with a signal waveform corresponding to at least a portion of the attack transient of said musical tone and at least one other of said intermediate terminals is provided with a signal waveform corresponding to at least a portion of the decay transient of said musical tone.

36. Signal waveform generation apparatus in accordance with claim 35 wherein at least one of said intermediate terminals is provided with a signal waveform corresponding to at least a portion of the steady state portion of said musical tone.

37. In an electrical musical instrument keying means comprising,
a succession of insulatedly separated intermediate contacts,
first and second engageable contacts relatively movable with respect to said intermediate contacts and supported by a rockable arm pivotable about a translatable axis so that translation of the latter axis in first and second opposed directions causes clockwise and counterclockwise displacement respectively of said first and second engageable countacts about the latter axis to keep said first and second contacts respectively then urged against a path defined by said intermediate contacts,
an output terminal,
means including resistive means coupling said first and second contacts to said output terminal,
a depressible key,
and means for coupling said depressible key to said translatable axis to move the latter axis in said first direction under depression of said key causing said first engageable contact to contact the first of said intermediate contacts and to move the latter axis in said second direction upon release of said key to momentarily establish contact simultaneously between said first engageable contact and said first intermediate contact and between said second engageable contact and the second of said intermediate contacts and thereafter interrupting the contact between said first engageable contact and said first intermediate contact while allowing said second engageable contact and said second intermediate contact to remain in contact.

38. Keying means in accordance with claim 37 and further comprising, means for selectively establishing substantially uniform velocity of said translatable axis along said second direction upon release of said depressible key.

39. An electrical musical instrument comprising, a plurality of electrical contacts, means supporting said contacts in sequential, aligned, spaced-apart relation, a plurality of sources of electric signals, each source providing a signal of a different timbre, said timbres corresponding to successive partials of the musical tones of actual musical instruments, an electrical network connecting the corresponding sources to said sequence of contacts in such combinations and degrees and in such order as to supply a sequence of combinations of said signals corresponding to said successive partials of said musical tones of actual musical instruments, a brush, and means supporting said brush in movable relation to said contacts so that said brush can touch one contact after another in the same sequence as said signal sources are connected to said contacts, whereby the movement of said brush across said sequence of contacts provides an electric representation of the complete musical tone progressively changing in character according to the sequence determined by said signal sources.

40. An electrical musical instrument as in claim 39, said network comprising a plurality of voltage dividers, one connected to each of said sources, each of said dividers having a plurality of taps, a first plurality of electrical buses individually connected to different ones of said taps, a second plurality of electrical buses individually connected to different ones of said contacts, and a plurality of resistors individually connected between various buses of said first plurality and various buses of said second plurality.

41. In a keyboard, electrical musical instrument, the one-note tone-generating subcombination comprising a one-note playing keyboard key, a plurality of electrical contacts, an insulating member supporting said contacts in linear, uniformly spaced apart relation, a plurality of essentially single-frequency sources of electric signals, each source being tuned to a different frequency, said frequencies being harmonically related as the partial tones of the note played by said key, a plurality of voltage dividers individually connected to various ones of said sources, said dividers having a plurality of taps, a plurality of resistors individually connected between various ones of said contacts and various ones of said taps, different contacts being connected through said resistors to different combinations of taps on said plurality of dividers, whereby different combinations of said signals are supplied to different ones of said contacts, a brush, means supporting said brush in movable relation to said contacts, the spacing between adjacent contacts being substantially equal to the width of a brush so that the brush can touch each contact, one at a time, in uninterrupted succession, and linkage operatively connecting said brush to said key so that operation of the playing key causes movement of the brush across a plurality of said contacts in succession, whereby the signal at the brush represents a musical note of progressively changing character.

42. The subcombination as in claim 41, additionally comprising a second brush, means connecting the two brushes together for movement in unison, the two brushes being spaced apart in the direction of their motion by an amount such that the distance between centers of the brushes is approximately one-half the distance between centers of adjacent contacts, and circuit means for combining the electric potentials of said two brushes.

43. In a keyboard electrical musical instrument, the one-note, tone-generating subcombination comprising a one-note playing, keyboard key, a plurality of electrical contacts, and insulating member supporting said contacts in linear, uniformly spaced apart relation, a plurality of essentially single frequency sources of electric signals, each source being tuned to a different frequency, said frequencies being harmonically related as the partial tones of the note played by said key, a plurality of phase shifters individually connected to various ones of said sources, a plurality of voltage dividers individually connected to various ones of said sources and phase shifters, said dividers having a plurality of taps, whereby a variety of amplitudes and phases of said signals are provided at different ones of said taps, a plurality of resistors individually connected between various ones of said contacts and various ones of said taps, different contacts being connected through said resistors to different combinations of taps on said plurality of dividers, whereby different combinations of said signals in various amplitudes and phases are supplied to different ones of said contacts, a brush, means supporting said brush in movable relation to said contacts so that the brush can touch each contact in succession, and linkage operatively connecting said brush to said key so that operation of playing key causes movement of the brush across a plurality of said contacts in succession, whereby the signal at the brush represents a musical note of progressively changing character.

44. Musical signal waveform generation apparatus comprising a sequence of waveform portion terminals, means for establishing temporally ordered segments of the waveform of a complete musical tone on said sequence of waveform portion terminals with each of said waveform portion terminals bearing a respective one of said segments, an output terminal, and means for sequentially coupling each of said waveform portion terminals to said output terminal to provide a signal of said waveform of a complete musical tone on said output terminal.

45. Musical signal waveform generation apparatus in accordance with claim 44 wherein said sequence of waveform portion terminals comprises a group of side-by-side contacts, said output terminal comprises an output contact, and said means for sequentially coupling comprises means for establishing relative movement between said group of side-by-side contacts and said output contact to establish connection between said output contact and each of said side-by-side contacts in sequence.

46. Signal waveform generation apparatus comprising, a plurality of devices capable of assuming one of first and second states, means for cascading said devices to form a counter for repetitively changing the count therein at a controllable rate determined by the impedance of an impedance element, said impedance element, and keying means coupled to said impedance element for changing the impedance thereof to effect perturbations in said rate.

47. In an electrical musical instrument keying means, a contact driving mechanism comprising a rocker arm pivotal about an axis of rotation between a first position and a second position and formed with a rounded portion arranged to rotate about said axis of rotation when said rocker arm rocks, a rotating driving means, and a rotatable idling means for coupling said rotating driving means to said rounded portion only when said rocker arm moves from said second position to said first position to then control the speed of such movement in accordance with that of said rotating driving means.

48. A contact driving mechanism in accordance with claim 47 wherein said rotating driving means rotates at constant angular velocity and further comprising, means for supporting said rotatable idling means to allow slipping between said idling means and said rounded portion when said rocker arm is moving from said first position to said second position while establishing frictional engagement between said idling means and both said rounded portion and said rotating driving means when said rocker arm is moving from said second position to said first position.

References Cited

UNITED STATES PATENTS

| | | | |
|---|---|---|---|
| 2,221,814 | 11/1940 | Reid | 84—1.17 |
| 2,227,100 | 12/1940 | Manatt | 84—1.21 |
| 2,447,799 | 8/1948 | Dickinson | 328—43 X |
| 2,541,051 | 2/1951 | Hanert | 84—1.03 |
| 2,601,265 | 6/1052 | Davis | 84—1.26 X |
| 2,697,959 | 12/1954 | Kent | 84—1.22 |
| 2,733,628 | 2/1956 | Bierl | 84—1.26 |
| 2,830,481 | 5/1958 | Hanert | 84—1.19 |
| 2,835,804 | 5/1958 | Luther | 328—38 |
| 2,918,669 | 12/1959 | Klein | 328—186 X |
| 2,964,986 | 12/1960 | Johnson | 84—1.19 |
| 3,082,330 | 3/1963 | Ward | 328—43 X |
| 3,006,228 | 10/1961 | White | 84—1.01 |
| 3,184,685 | 5/1965 | Funk | 328—37 X |

FOREIGN PATENTS

| | | |
|---|---|---|
| 339,225 | 12/1930 | Great Britain. |

ARTHFUR GAUSS, *Primary Examiner.*

ROBERT H. PLOTKIN, *Assistant Examiner.*

U.S. Cl. X.R.

84—1.19, 1.04

U.S. DEPARTMENT OF COMMERCE

PATENT OFFICE

Washington, D.C. 20231

---

UNITED STATES PATENT OFFICE

CERTIFICATE OF CORRECTION

Patent No. 3,441,653 April 29, 1969

Melville Clark, Jr.

It is certified that error appears in the above identified patent and that said Letters Patent are hereby corrected as shown below:

Column 21, lines 56 to 59, in claim 1 after "terminal", "during a second time interval contiguous with said first time interval" should be permuted with and should precede "the sum of said first and second time intervals being no greater than the duration of a musical tone".

Signed and sealed this 24th day of February 1970.

(SEAL)
Attest:

Edward M. Fletcher, Jr.
Attesting Officer

WILLIAM E. SCHUYLER, JR.
Commissioner of Patents